US012285074B2

(12) United States Patent
Blanche et al.

(10) Patent No.: US 12,285,074 B2
(45) Date of Patent: Apr. 29, 2025

(54) ARTICLE OF FOOTWEAR AND METHOD OF MANUFACTURING AN ARTICLE OF FOOTWEAR

(71) Applicant: NIKE, Inc., Beaverton, OR (US)

(72) Inventors: Rory S. Blanche, Portland, OR (US); Mihwa Hong, Portland, OR (US); Shamees Mohamed, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 282 days.

(21) Appl. No.: 18/083,668

(22) Filed: Dec. 19, 2022

(65) Prior Publication Data
US 2023/0120495 A1 Apr. 20, 2023

Related U.S. Application Data

(62) Division of application No. 16/662,273, filed on Oct. 24, 2019, now Pat. No. 11,559,106.

(51) Int. Cl.
*A43B 13/18* (2006.01)
*A43B 1/00* (2006.01)
*A43B 13/16* (2006.01)
*A43D 9/00* (2006.01)
*A43D 25/06* (2006.01)
*B29C 43/00* (2006.01)
*B29C 65/48* (2006.01)

(52) U.S. Cl.
CPC .......... *A43B 13/187* (2013.01); *A43B 1/0063* (2013.01); *A43B 13/16* (2013.01); *A43D 9/00* (2013.01); *A43D 25/06* (2013.01); *B29C 43/00* (2013.01); *B29C 65/48* (2013.01)

(58) Field of Classification Search
CPC ....... A43B 1/0063; A43B 13/04; A43B 13/16; A43B 13/187; B29C 43/00; B29C 65/48; Y02P 70/62; A43D 25/06; A43D 9/00; B29D 35/122
See application file for complete search history.

(56) References Cited

U.S. PATENT DOCUMENTS

2021/0120913 A1* 4/2021 Blanche .................. A43D 9/00

OTHER PUBLICATIONS

Translation of abstract of WO2009042599.*
Translation of claims of WO2009042599.*
Translation of WO2007132731.*
Translation of WO2019073607.*
Translation of description of WO2009042599.*

* cited by examiner

Primary Examiner — Sonya M Sengupta
(74) Attorney, Agent, or Firm — Quinn IP Law

(57) ABSTRACT

A sole structure for an article of footwear includes a unitary cushioning component comprising a plurality of scrap foam pieces configured as a plurality of different polyhedron shapes and a resin binder securing the scrap foam pieces to one another. The sole structure may comprise a midsole including an outer shell defining a central cavity. The cushioning component may be disposed in the central cavity as a core of the midsole. A method of manufacturing an article of footwear cutting the scrap foam body into pieces, mixing the pieces with a resin binder, and compression molding the mixed pieces and resin binder in a mold to form a cushioning component of a sole structure of the article of footwear.

9 Claims, 14 Drawing Sheets

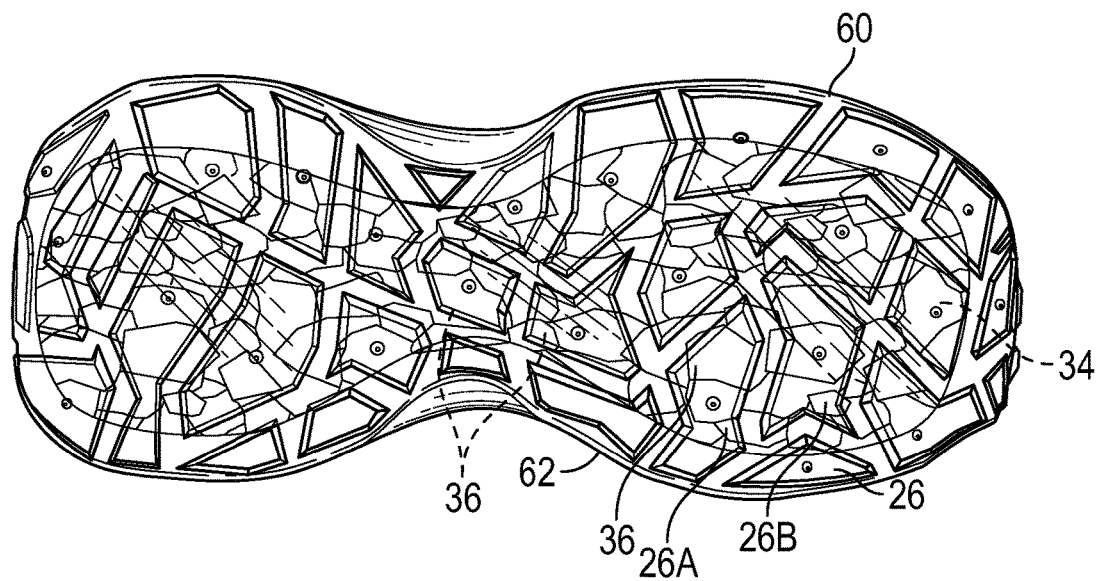
FIG. 8
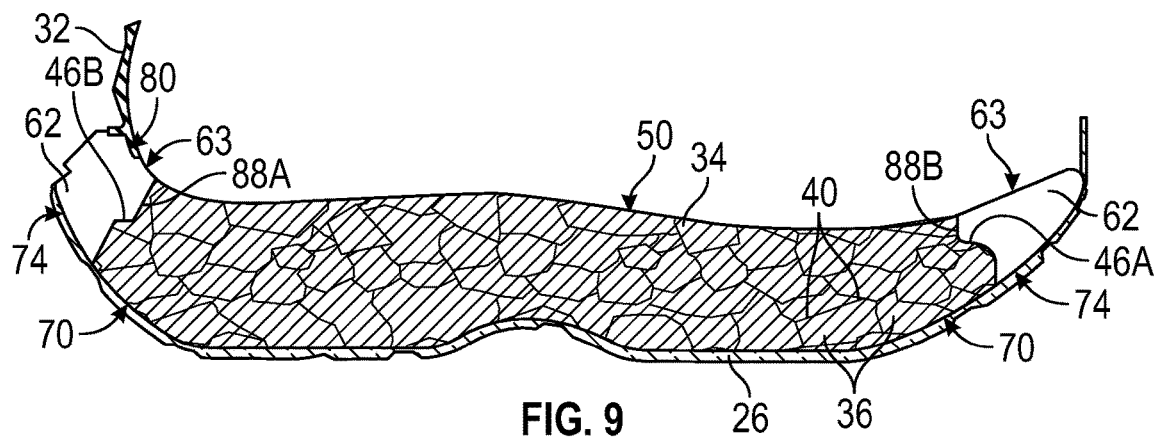
FIG. 9
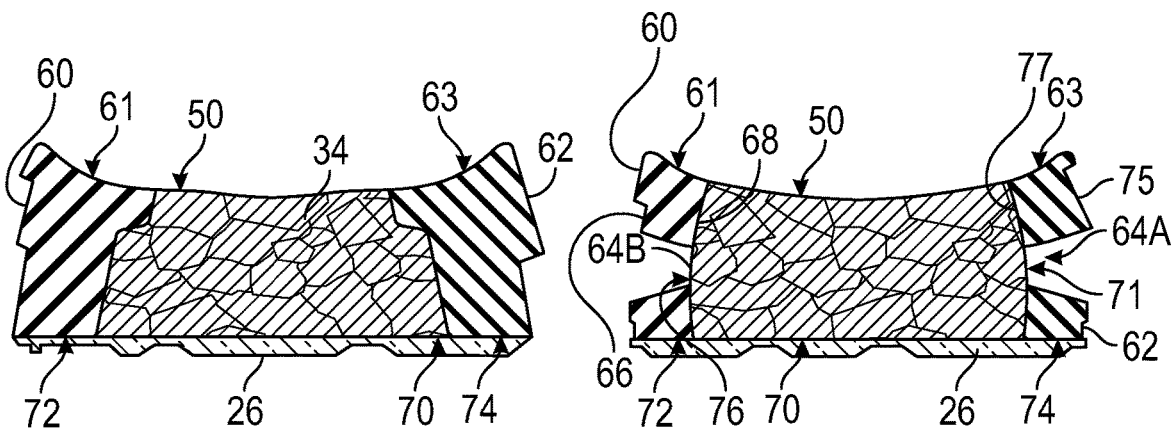
FIG. 10
FIG. 11

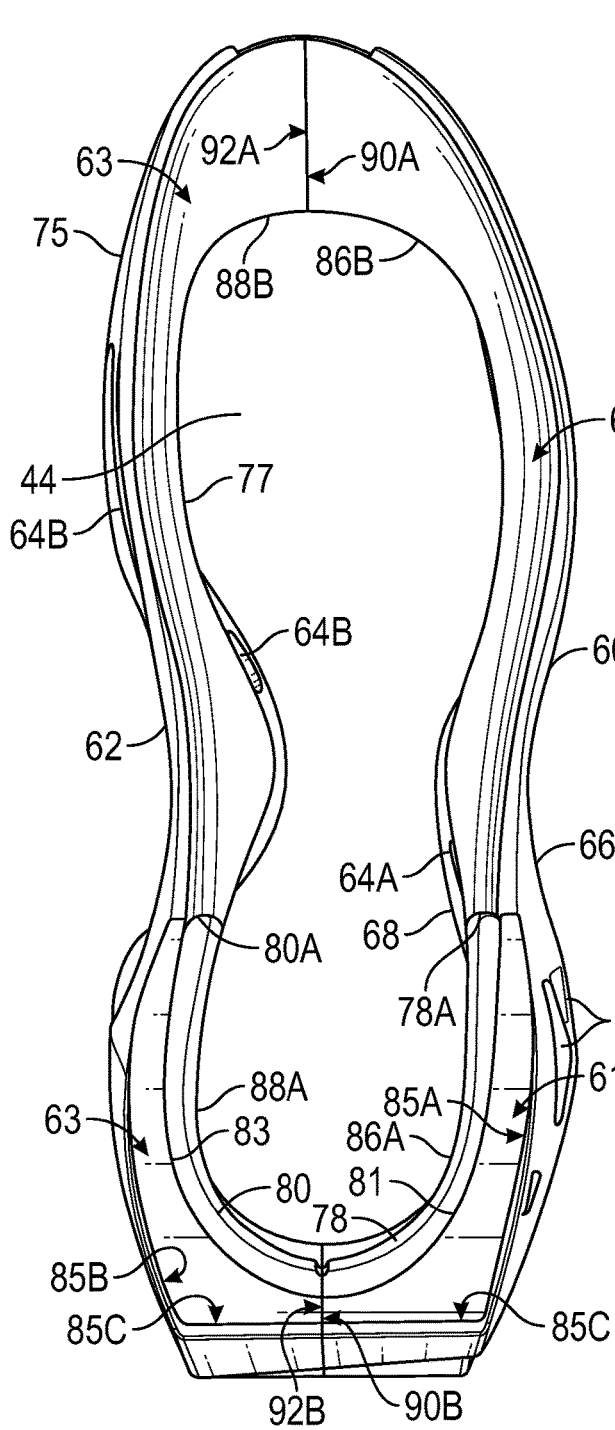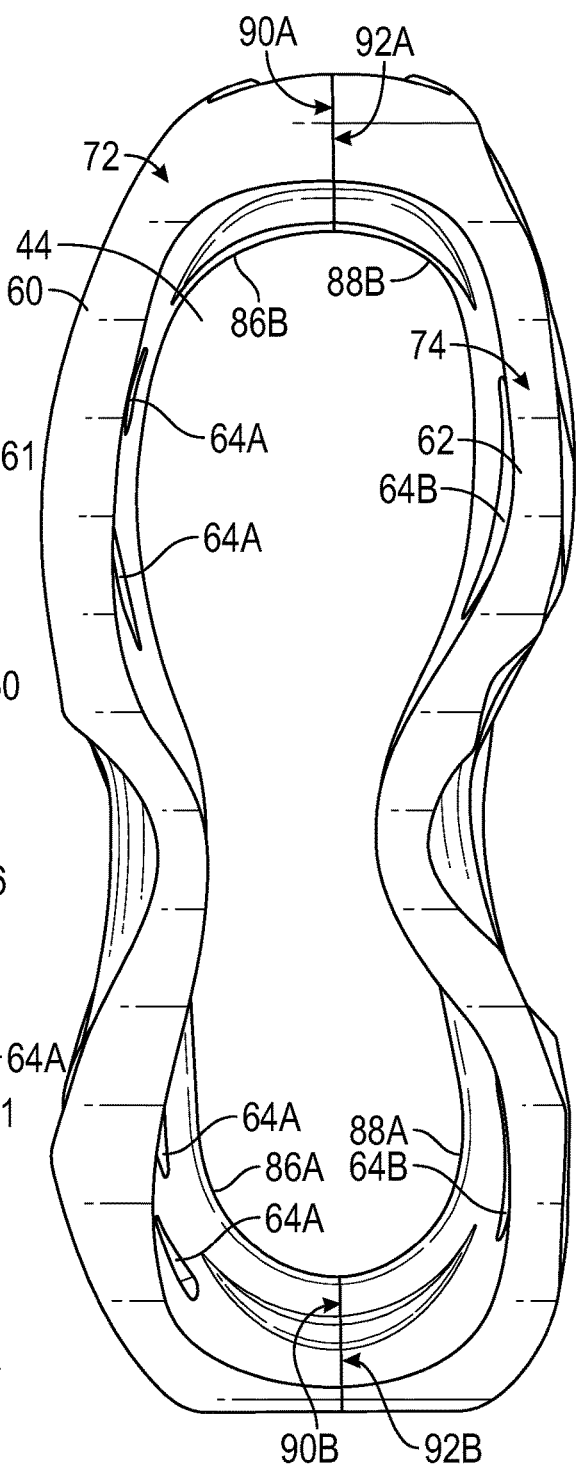
FIG. 14
FIG. 15

ARTICLE OF FOOTWEAR AND METHOD OF MANUFACTURING AN ARTICLE OF FOOTWEAR

CROSS-REFERENCE TO RELATED APPLICATIONS

This application is a divisional of and claims the benefit of priority to U.S. Nonprovisional application Ser. No. 16/662,273, filed Oct. 24, 2019 which is incorporated by reference in its entirety.

TECHNICAL FIELD

The present disclosure generally relates to an article of footwear and a method of manufacturing an article of footwear.

BACKGROUND

Footwear often includes many components of many different materials. An article of footwear typically includes a sole structure configured to be located under a wearer's foot to space the foot away from the ground. Sole structures in athletic footwear are typically configured to provide cushioning, motion control, and/or resilience. Footwear manufacturing strives to provide high quality, durable footwear in an environmentally conscience manner.

BRIEF DESCRIPTION OF THE DRAWINGS

The drawings described herein are for illustrative purposes only, are schematic in nature, and are intended to be exemplary rather than to limit the scope of the disclosure.

FIG. 8 is a bottom view of the sole structure of FIG. 2.

FIG. 9 is a cross-sectional view of the sole structure and heel counter of FIG. 2. taken at lines 9-9 in FIG. 2.

FIG. 10 is a cross-sectional view of the sole structure and heel counter of FIG. 2. taken at lines 10-10 in FIG. 2.

FIG. 11 is a cross-sectional view of the sole structure and heel counter of FIG. 2. taken at lines 11-11 in FIG. 2.

FIG. 14 is a top view of an outer shell included in the sole structure of FIG. 2.

FIG. 15 is a bottom view of the outer shell of FIG. 14.

DESCRIPTION

Figure 1:
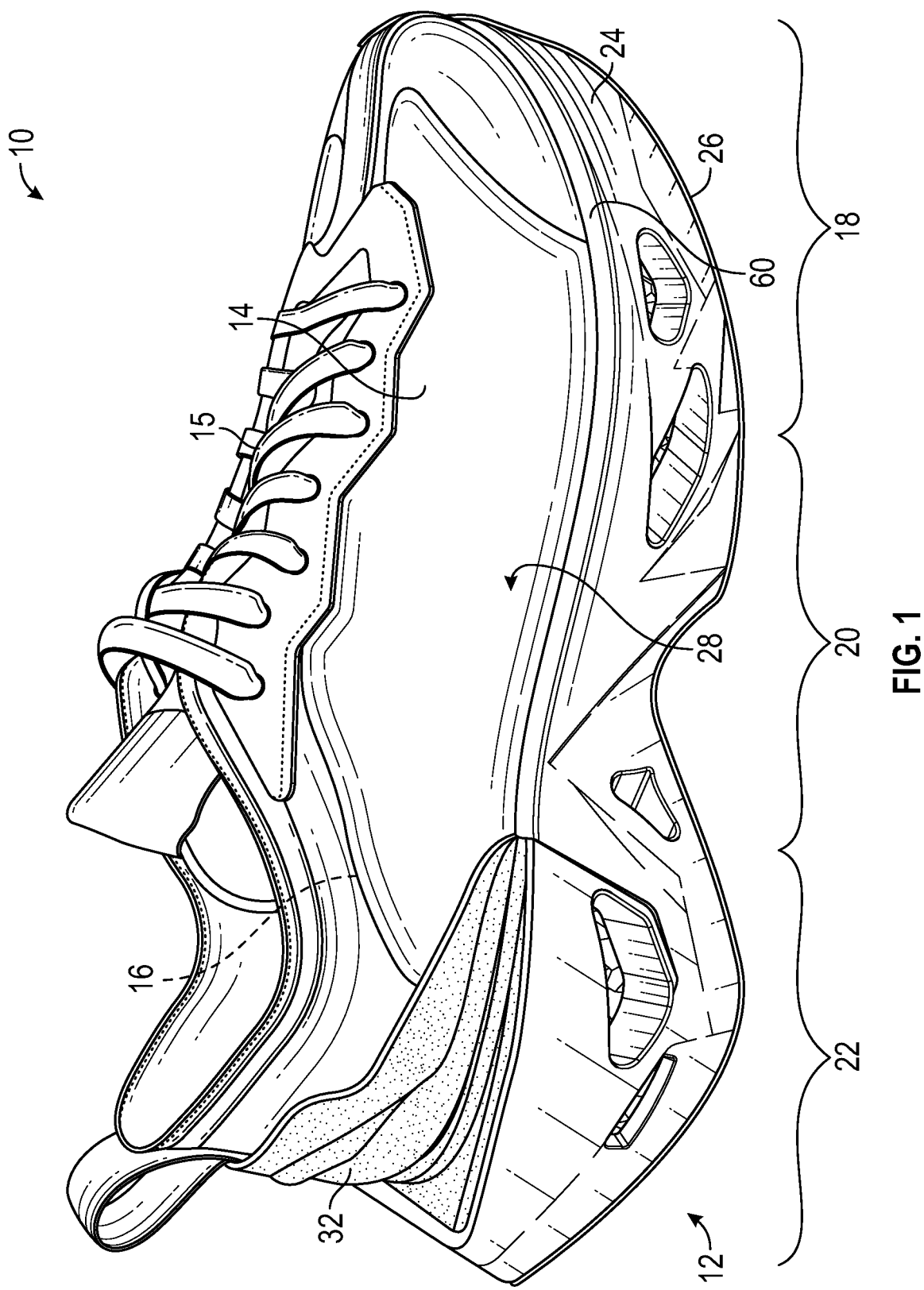
FIG. 1 is a lateral side view of an article of footwear including an upper, a sole structure, and a heel counter.

The present disclosure generally relates to an article of footwear and to a method of manufacturing the article of footwear that may include using scrap foam for at least one cushioning component. Stated differently, a scrap foam body from a first footwear application can be utilized in a second footwear application to reduce waste. The scrap foam pieces may result from cutting one or more scrap foam bodies. More specifically, in an aspect of the disclosure, the sole structure may include a cushioning component comprised of a plurality of scrap foam pieces and a resin binder securing the pieces to one another. The cushioning component may consist of only the scrap foam pieces, the resin binder, and in some implementations, dye added to the binder. No foaming agents, virgin foam material, or other additives are included in the cushioning component. Most scrap foam bodies may be recycled under the method as the initial shape of the scrap foam body is largely irrelevant given that it is cut into smaller pieces when utilized in the second footwear application, such as by chopping the scrap foam body into chopped pieces. Because the scrap foam body is cut, a majority of the scrap foam pieces may be configured as a plurality of different polyhedron shapes. For example, cutting blades may impart relatively straight faces on the pieces as well as angles between faces of the pieces, resulting in mostly polyhedron-shaped pieces. As a series of cutting operations may be employed, the pieces may have different sizes and different polyhedron shapes. The scrap foam body is thus not wasted but is reused as a cushioning component of a footwear sole structure, such as a midsole component. The cut pieces of different polyhedron shapes provide a more even (e.g., smoother) outer surface having denser edges and greater surface area than would a plurality of torn or crushed pieces of similar sizes, for example. A relatively smooth outer surface may provide greater comfort at the foot-facing surface as well as denser edges for structural stability of the cushioning component. Additionally, a relatively smooth outer surface may provide better bonding surfaces for the outer shell described herein.

In one example, a dye may be mixed in the resin binder prior to mixing the pieces of the scrap foam body with the resin binder. In one or more embodiments, the scrap foam pieces comprise Pebax® thermoplastic elastomer foam, and the resin binder comprises polyurethane. It should be appreciated however, that other materials may be used for the scrap foam pieces and/or for the resin binder within the scope of the present disclosure.

The cushioning component may be a midsole core, and the sole structure may further comprise an additional cushioning component configured as an outer shell defining a central cavity. The midsole core may be disposed in the central cavity as a core of the midsole. The outer shell thus at least partially surrounds the midsole core, and acts as a protective cage to shield the midsole core around its periphery. For example, the outer shell may comprise a lateral shell body extending along a lateral side of the midsole core and a medial shell body extending along a medial side of the midsole core. The lateral shell body may be coupled to the medial shell body forward of the midsole core and rearward of the midsole core. For example, each shell body may have longitudinally-extending bonding surfaces. The midsole core may be a first foam material, and the outer shell may be a second foam material different than the first foam material. For example, the midsole core may be Pebax® and the outer shell may be Phylon.

The central cavity defined by the outer shell may be a through hole and an upper surface and a lower surface of the midsole core may be exposed in the central cavity. Additionally, the upper surface of the midsole core may be flush with the lateral shell body and the medial shell body, the lower surface of the midsole core may be flush with the lateral shell body and the medial shell body, or both the upper surface and the lower surface of the midsole core may be flush with the lateral shell body and the medial shell body. Additionally, at least one of the medial shell body or the lateral shell body may have an inner side and an outer side, and at least one through hole extending from the inner side to the outer side with the midsole core extending across the through hole at the inner side.

In an aspect, the lateral shell body and the medial shell body may each have an inner rim extending inward into the cavity. The midsole core may interfit with the lateral side body and the medial side body at the inner rim so that the inner rim rests on the midsole core. The inner rim may be at the front and/or at the rear of each of the lateral shell body and the medial shell body. A notch in the midsole core may interfit with the inner rim. The inner rim and the notch may be referred to as complementary locating features that help in properly aligning the shell bodies and the midsole core during assembly.

The lateral shell body may have a bonding surface forward of the midsole core, and the medial shell body may have a bonding surface forward of the midsole core contiguous with and coupled to the bonding surface of the lateral shell body that is forward of the midsole core. The bonding surfaces may be bonded to one another, such as by applying adhesive on the bonding surfaces and then placing the bonding surfaces into contact with one another. In one aspect, applying adhesive may include applying primer and then applying cement to the bonding surfaces.

Similarly, the lateral shell body may have a bonding surface rearward of the core, and the medial shell body may have a bonding surface rearward of the core contiguous with and coupled to the bonding surface of the lateral shell body that is rearward of the midsole core. The bonding surfaces may extend in a longitudinal direction of the article of footwear and may be planar.

In an aspect, the sole structure may include an outsole extending across and secured to a lower surface of the midsole core, to a lower surface of the lateral shell body, and to a lower surface of the medial shell body. In one or more embodiments, the outsole may be at least partially transparent, so that the lateral shell body, the midsole core, and the medial shell body may be viewed through the outsole.

In some embodiments, a heel counter may be secured to an upper surface of the lateral shell body and to an upper surface of the medial shell body in a heel region of the article of footwear. The heel counter may also be secured to the upper of the article of footwear, such as to an exterior surface of the upper around a rear of the heel portion of the upper.

In another aspect, an article of footwear may comprise a midsole including a first cushioning component configured as a midsole core and a second cushioning component configured as an outer shell defining a central cavity. The midsole core may be disposed in the central cavity with the outer shell bordering a lateral side and a medial side of the midsole core and defining a plurality of through holes exposing the lateral side and the medial side of the midsole core. The midsole core may or may not comprise cut scrap foam pieces as discussed above.

A method of manufacturing an article of footwear may comprise receiving a scrap foam body, cutting the scrap foam body into pieces, and mixing the pieces with a resin binder to form a mixture. The method may further include compression molding the mixture in a mold to form a cushioning component of a sole structure of the article of footwear. Due to the cutting, the pieces may be configured as a plurality of polyhedrons of different shapes as discussed herein. The pieces retain their polyhedron shapes in the cushioning component as assembled in the finished article of footwear (except as may be slightly reshaped to conform to a mold in which they are compression molded) and are not ground, melted, pelletized or otherwise processed in a manner that changes their cut polyhedron shapes under the method disclosed herein.

In an aspect, the method may comprise drying the mixture and pouring the mixture into the mold prior to compression molding the mixture in the mold. In another aspect, the method may include adding dye to the resin binder prior to mixing the pieces with the resin binder. Accordingly, the cushioning component made from the mixture of pieces scrap foam body and resin binder can be dyed to a desired color.

In another aspect, the cushioning component may be a midsole core, and the method of manufacturing may further comprise bonding a medial shell body to a medial side of the midsole core and a lateral shell body to a lateral side of the midsole core so that the medial shell body and the lateral shell body form an outer shell defining a central cavity with the midsole core disposed in the central cavity. Bonding the medial shell body to the medial side of the midsole core may include applying adhesive to the medial shell body, applying adhesive to the medial side of the midsole core, and pressing the medial shell body against the medial side of the midsole core. Similarly, bonding the lateral shell body to the lateral side of the midsole core may include applying adhesive to the lateral shell body, applying adhesive to the lateral side of the midsole core, and pressing the lateral shell body against the lateral side of the midsole core. Applying adhesive may include applying primer and applying cement.

In an aspect, the method of manufacturing may further comprise, prior to pressing the medial shell body against the medial side of the midsole core and pressing the lateral shell body against the lateral side of the midsole core, aligning the medial shell body and the lateral shell body with the midsole core by mating an alignment feature of the medial shell body and an alignment feature of the lateral shell body with a complementary alignment feature of the midsole core.

Additionally, the method of manufacturing the article of footwear may further comprise bonding an outsole to a lower surface of the midsole core, to a lower surface of the lateral shell body, and to a lower surface of the medial shell body. Still further, the method of manufacturing may further comprise bonding a heel counter to an upper surface of the lateral shell body and to an upper surface of the medial shell body in a heel region of the article of footwear.

The above features and advantages and other features and advantages of the present teachings are readily apparent from the following detailed description of the modes for carrying out the present teachings when taken in connection with the accompanying drawings.

Referring to the drawings, wherein like reference numbers refer to like components throughout the views, FIG. 1 is a lateral side view of an article of footwear 10 that has a sole structure 12 and an upper 14 secured to the sole structure 12. The upper 14 forms a foot-receiving cavity 16 configured to receive a foot. The upper 14 may be a variety of materials, such as leather, textiles, polymers, cotton, foam, composites, etc., and is shown with a lace 15 for tightening the upper 14 around a foot.

The footwear 10 illustrated herein is depicted as an athletic shoe configured for sports or for wear as a leisure shoe, but the footwear 10 is not limited to athletic or leisure shoes. The footwear 10 including its components described herein may be an athletic shoe, a leisure shoe, a dress shoe, a work shoe, a sandal, a slipper, a boot, or any other category of footwear. As indicated in FIG. 1, the footwear 10 may be divided into a forefoot region 18, a midfoot region 20, and a heel region 22, which are also the forefoot region, the midfoot region, and the heel region, respectively, of the sole structure 12 and the upper 14. The forefoot region 18 generally includes portions of the article of footwear 10 corresponding with the toes and the joints connecting the metatarsals with the phalanges. The midfoot region 20 generally includes portions of the article of footwear 10 corresponding with the arch area and instep of the foot, and the heel region 22 corresponds with rear portions of the foot, including the calcaneus bone. The forefoot region 18, the midfoot region 20, and the heel region 22 are not intended to demarcate precise areas of the footwear 10 but are instead intended to represent general areas of the footwear 10 to aid in the following discussion.

The sole structure 12 includes a midsole 24 and an outsole 26. An insole (not shown) may rest on the sole structure 12 in the foot-receiving cavity 16. The midsole 24 attenuates ground reaction forces (e.g., provides cushioning) when compressed between the foot and the ground during walking, running, or other ambulatory activities. The midsole 24 includes multiple components integrated as a unit and is described in greater detail with respect to FIG. 2. The outsole 26 establishes the ground-engaging surface of the article of footwear 10 and may be one-piece or may be several discrete outsole components. In one example, the outsole 26 may be formed from a wear-resistant material that may be textured to impart traction. For example, the outsole 26 may comprise a natural or synthetic rubber.

When the foot is positioned within the foot-receiving cavity 16 of the footwear 10, it is supported on a foot-facing surface of the midsole 24. The foot-facing surface of the midsole 24 may be covered by a strobel (not shown) secured to a lower region of the upper 14. Also, an insole (not shown) may rest on the strobel or directly on the sole structure 12 in embodiments without a strobel, in which case the foot is supported by both the sole structure 12 and the insole.

Figure 5:
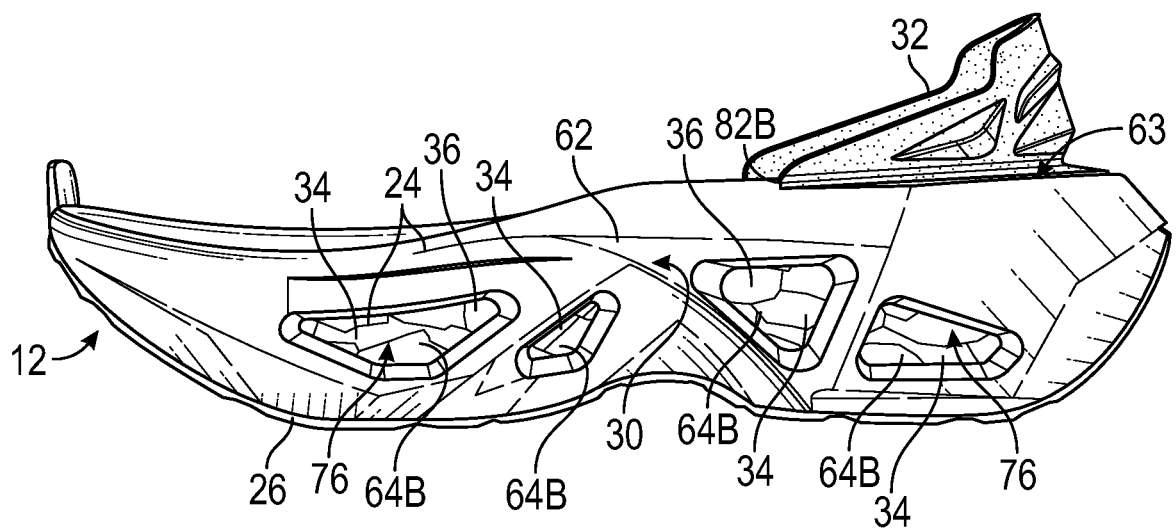
FIG. 5 is a medial side view of the sole structure and heel counter of FIG. 2.

The footwear 10 has a lateral side 28 (shown in FIG. 1) and a medial side 30 (best shown in FIG. 5). The lateral side 28 and the medial side 30 extend through each of the forefoot region 18, the midfoot region 20, and the heel region 22, each falling on an opposite side of a longitudinal midline LM (FIG. 2) of the article of footwear 10, as is understood by those skilled in the art. The longitudinal midline LM extends along a longitudinal axis of the article of footwear 10. The medial side 30 is thus considered opposite to the lateral side 28.

Figure 2:
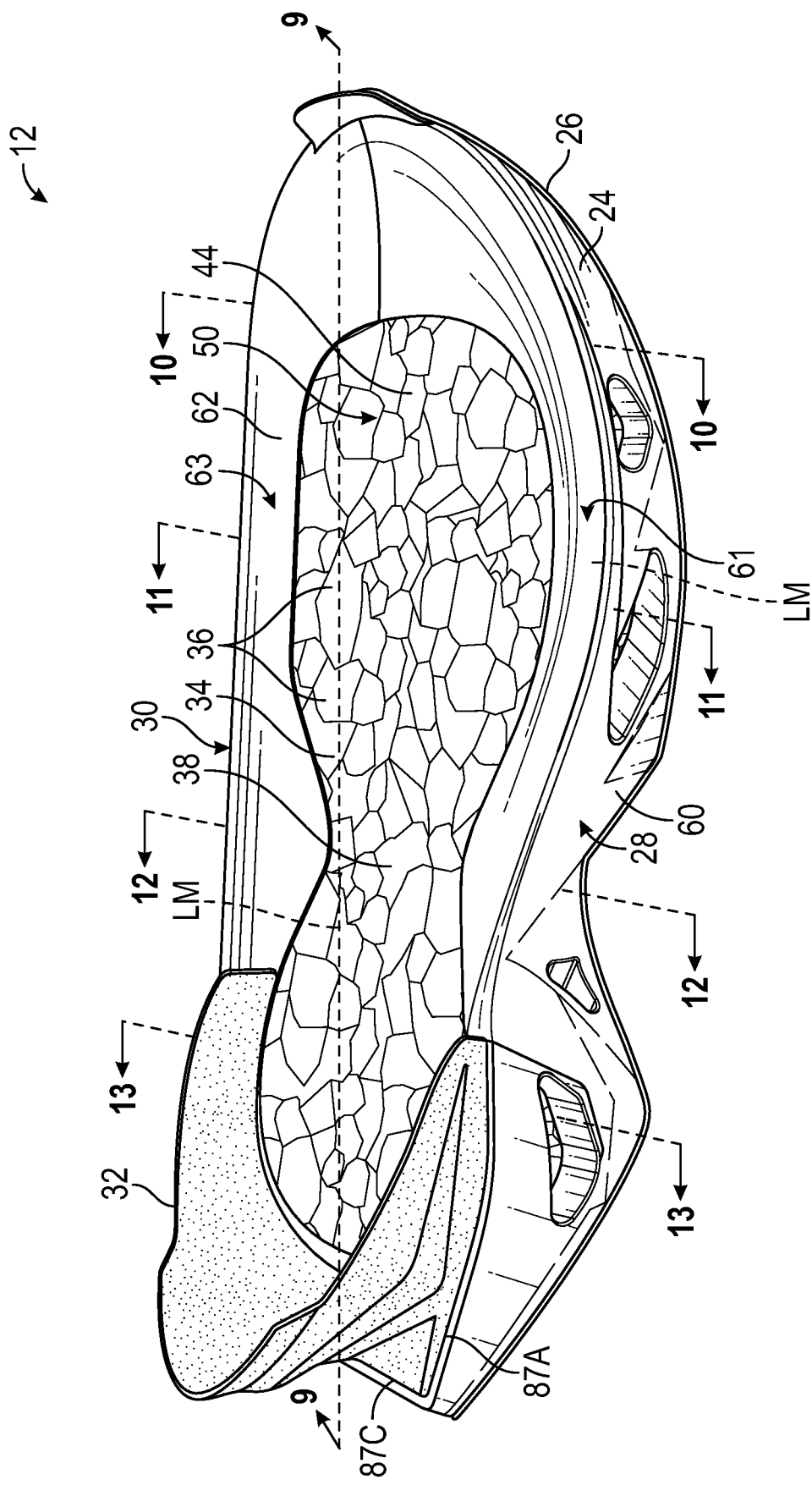
FIG. 2 is a perspective view of the sole structure including a midsole and the heel counter of the article of footwear of FIG. 1, not showing the upper.

FIG. 2 is a perspective view of the sole structure 12 including the midsole 24 and a heel counter 32. The midsole 24 includes a unitary cushioning component, referred to herein as a midsole core 34, that is comprised of cut pieces 36 of a scrap foam body 38 (shown in FIG. 22) coated with a resin binder 40 that secures the pieces 36 to one another. The cut pieces 36 result from a cutting the scrap foam body 38 as described herein, a process that may also be referred to as chopping. Accordingly, the pieces 36 may be referred to as either cut pieces or chopped pieces. Additionally, a dye may be mixed in the resin binder prior to mixing the chopped pieces 36 with the resin binder 40. In a non-limiting example, the scrap foam body 38 (and, therefore, the cut pieces 36) comprises Pebax® thermoplastic elastomer foam and may be sold under the tradename ZoomX by Nike, Inc. The resin binder 40 may comprise a water-based polyurethane dispersion. The scrap foam body 38, the resulting pieces 36, and the resin binder 40 may be other materials than these within the scope of the disclosure.

Figure 22:
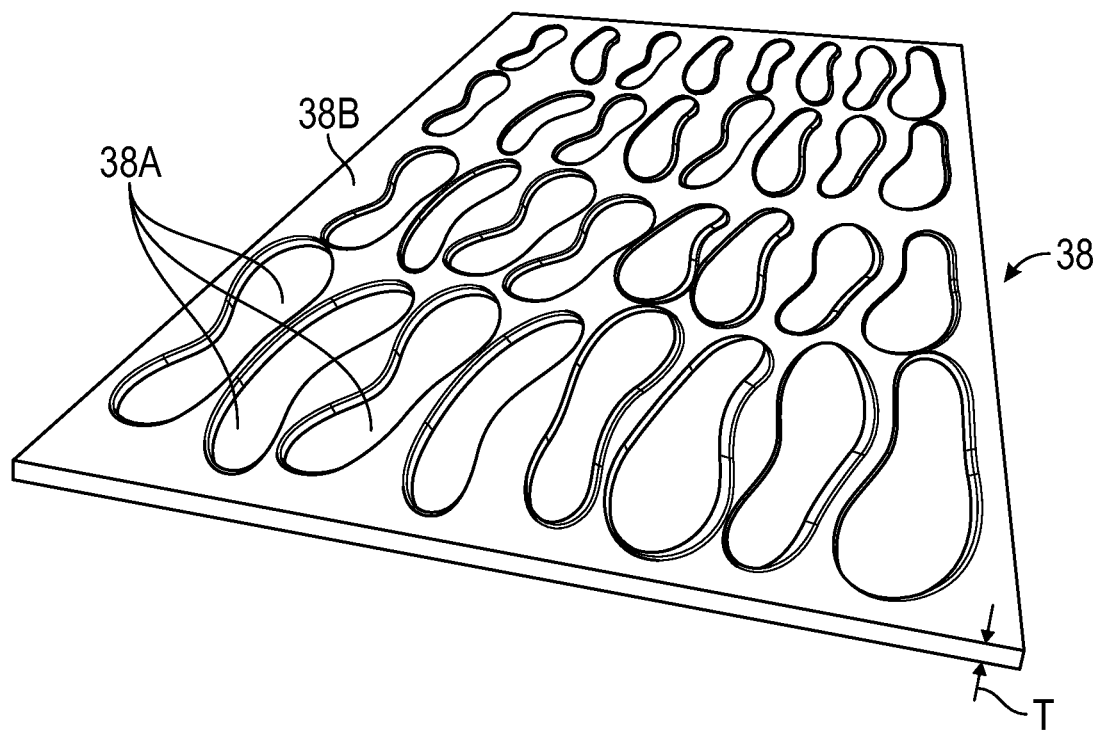
FIG. 22 is a perspective view of a scrap foam body.

The scrap foam body 38 shown in FIG. 22 is what remains of a sheet of foam after a plurality of one-piece midsole layers used in a first footwear application (e.g., for other articles of footwear of a different configuration than article of footwear 10) are cut out leaving behind a plurality of recesses or apertures 38A and remaining material 38B surrounding the recesses or apertures 38A. The sheet of foam may initially have a generally uniform thickness T. The remaining material 38B of the sheet may also be split to reduce the thickness prior to a cutting process that results in the pieces. Accordingly, when the remainder 38B is cut, at least the thickness dimension of a majority of the chopped pieces 36 may be substantially uniform. If the cutting process is controlled to provide width and length dimensions of most cut pieces 36 within predetermined dimensions, the resulting volume of most individual chopped pieces will be within a predetermined range of volumes. The cutting process may subject the scrap foam body 38 to a series of passes through cutting machine(s) having straight cutting blades disposed at different angles relative to the direction of movement of the blades. Additionally, the pieces 36 may be disposed in different orientations on a conveyor as they pass through the cutting machine(s), creating three dimensional pieces having a plurality of different polyhedron shapes. For example, at least some if not a majority of the pieces will have flat faces resulting from a plane of cutting of the cutting blade through the remainder 38B, a subsequent cutting of a first stage of pieces, a still subsequent cutting of a second stage of pieces, etc. These pieces 36 thus have a plurality of different polyhedron shapes as best shown, for example, in FIGS. 3, 8-13, and 23-24. The cut pieces of different polyhedron shapes provide a more even (e.g., smoother) outer surface having denser edges and greater surface area than would a plurality of torn or crushed pieces of similar sizes, for example. A relatively smooth outer surface may provide greater comfort at the foot-facing surface as well as denser edges for structural stability of the midsole core 34. Additionally, a relatively smooth outer surface may provide better bonding surfaces for the outer shell 60, 62.

Figure 3:
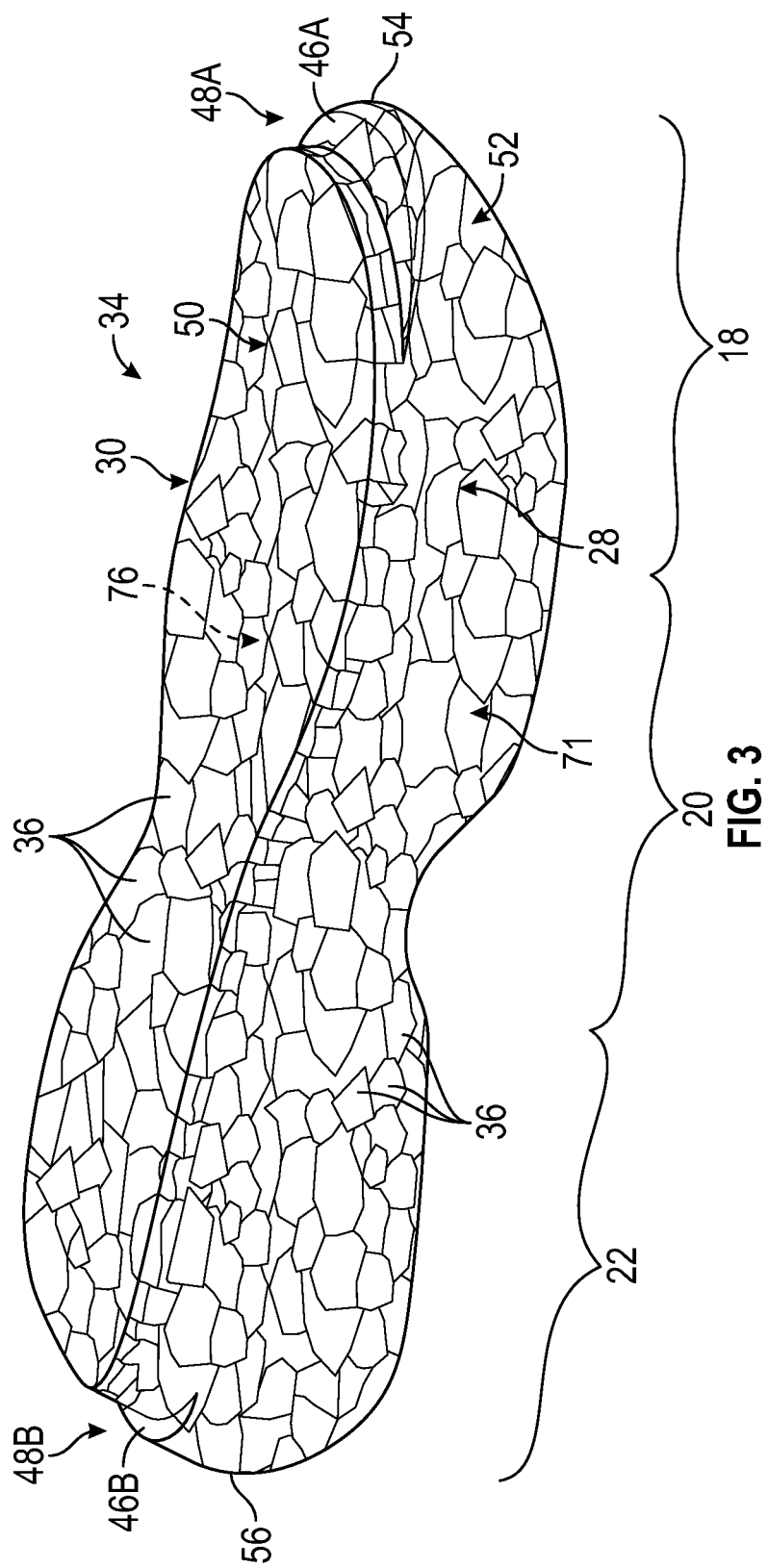
FIG. 3 is a perspective view of a core of the midsole of FIG. 2.

In addition to the midsole core 34, the midsole 24 includes an additional cushioning component configured as an outer shell 60, 62 that defines a central cavity 44 (best shown in FIGS. 14 and 15) with the midsole core 34 disposed in and filling the central cavity 44 as shown in FIG. 2. The midsole core 34 is bonded to the outer shell 60, 62 and includes complementary locating features 46A, 46B (best shown in FIG. 3) that help in properly aligning the midsole core 34 to the outer shell 60, 62 during assembly. More specifically, the midsole core 34 has a front outer ledge 46A in the forefoot region 18 and a rear outer ledge 46B in the heel region 22. The ledges 46A and 46B are defined by a front notch 48A and a rear notch 48B between the upper surface 50 and the side surface 52 of the midsole core 34. The notches 48A, 48B and the accompanying ledges 46A, 46B each extend around a portion of the perimeter of the midsole core 34. The front notch 48A and the front outer ledge 46A extend partially around the perimeter at a forward extent 54 of the midsole core 34 from the lateral side 28 to the medial side 30. Similarly, the rear notch 48B and the rear outer ledge 46B extend partially around the perimeter at a rear extent 56 from the lateral side 28 to the medial side 30. The midsole core 34 is shown in FIG. 3 as formed after the mixture of chopped pieces 36, resin binder 40 and dye, if used, is mixed, dried, and compression molded.

Figure 4:
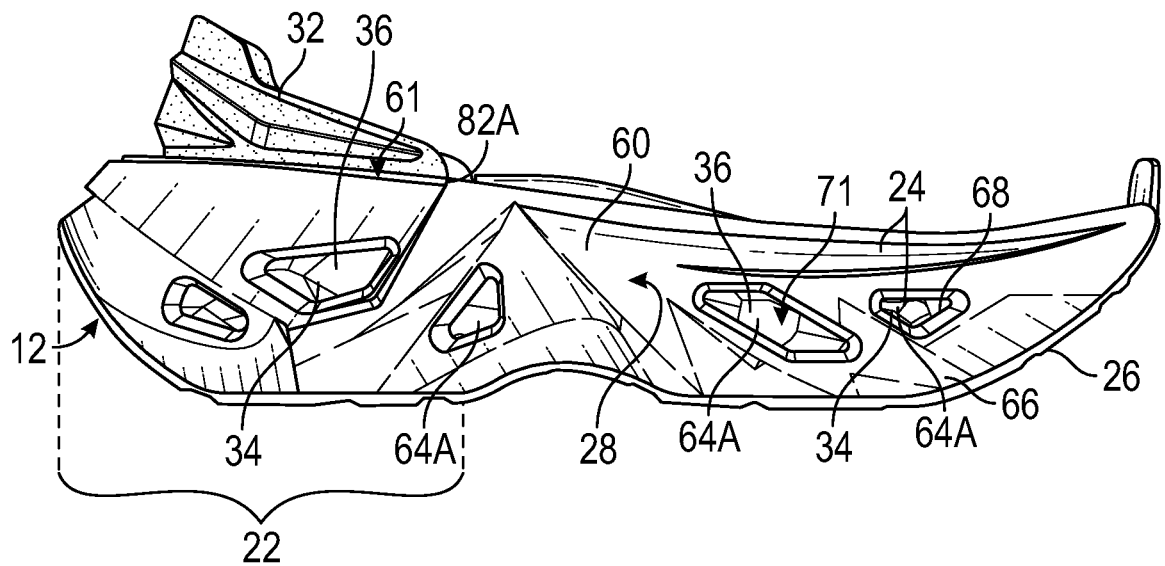
FIG. 4 is a lateral side view of the sole structure and heel counter of FIG. 2.

The outer shell 60, 62 includes a lateral shell body 60 and a medial shell body 62 bonded to one another forward of and rearward of the midsole core 34. The lateral shell body 60 and the medial shell body 62 may each be formed by compression molding of injection molded phylon preforms. The lateral shell body 60 extends along the lateral side 28 of the midsole core 34 (e.g., along the lateral side surface 71) as shown in FIG. 4. The medial shell body 62 extends along the medial side 30 of the midsole core 34 (e.g., along the medial side surface 76) as shown in FIG. 5. The upper surface 50 of the midsole core 34 is flush with an upper surface 61 of the lateral shell body 60 and with an upper surface 63 of the medial shell body 62 as shown in FIGS. 2 and 9-13, for example. Similarly, a lower surface 70 of the midsole core 34 is flush with a lower surface 72 of the lateral shell body 60 where the surfaces 70, 72 meet, and with a lower surface 74 of the medial shell body 62 where the surfaces 70, 74 meet as shown in FIGS. 9-13, for example. In other embodiments, only the upper surface 50 is flush with the upper surface 61, 62 and the lower surface 70 is not flush with the lower surfaces 72, 74, or only the lower surface 70 is flush with the lower surfaces 72, 74 and the upper surface 50 is not flush with the upper surfaces 61, 62. Similarly, a lower surface 70 of the midsole core 34 is flush with a lower surface 72 of the lateral shell body 60 where the surfaces 70, 72 meet, and with a lower surface 74 of the medial shell body 62

As shown in FIGS. 4 and 5, each of the lateral shell body 60 and the medial shell body 62 defines a plurality of through holes 64A, 64B, respectively, extending entirely through the shell bodies 60, 62. More specifically, the through holes 64A in the lateral shell body 60 extend from an outer side 66 of the lateral shell body 60 to an inner side 68 of the lateral shell body 60, best shown in FIGS. 11 and 14. A lateral side surface 71 of the midsole core 34 extends across the through holes 64A at the inner side 68. Similarly, the through holes 64B in the medial shell body 62 extend from an outer side 75 of the medial shell body 62 to an inner side 77 of the medial shell body 62, best shown in FIGS. 11 and 14. A medial side wall 76 of the midsole core 34 extends across the through holes 64B at the inner side 77. The lateral side wall 71 and the medial side wall 76 of the midsole core 34 are exposed and viewable from an exterior of the sole structure 12 at the through holes 64A, 64B, respectively. The through holes 64A, 64B reduce the overall weight of the shell bodies 60, 62. Additionally, the compressibility of the shell bodies 60, 62 is increased at those areas extending over a through hole 64A or 64B.

The lateral and medial shell bodies 60, 62 and the midsole core 34 have complementary locating features that help in properly aligning the shell bodies 60, 62 and the midsole core 34 during assembly. For example, as shown in FIGS. 14-15 and 18-19, the lateral shell body 60 has an inner rim 86A extending inward into the central cavity 44 at a rear of the cavity 44 and an inner rim 86B extending inward into the cavity 44 at a front of the cavity 44. As shown in FIGS. 9 and 14-17, the medial shell body 62 has an inner rim 88A extending inward into the cavity 44 at the rear of the cavity 44 and an inner rim 88B extending inward into the cavity at the front of the cavity 44. The midsole core 34 interfits with the lateral shell body 60 and the medial shell body 62 at the inner rims 86A, 86B, 88A, and 88B so that the inner rims rests on and are bonded to the ledges 46A, 46B of the midsole core 34. More specifically, the inner rims 86A, 88A fit into the notch 48B and overlay and are contiguous with the rear outer ledge 46B. The inner rims 86B, 88B fit into the notch 48A and overlay and are contiguous with the front outer ledge 46A. The inner rims 86A, 86B, 88A, 88B and the notches 48A, 48B may be referred to as complementary locating features.

Figure 6:
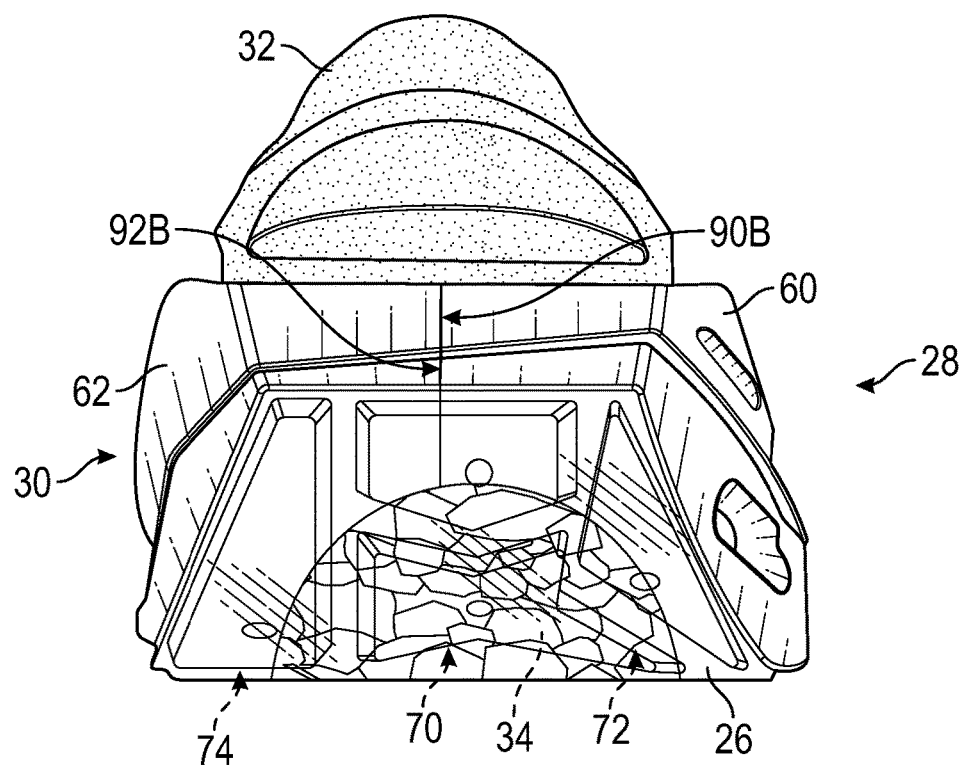
FIG. 6 is a rear view of the sole structure of FIG. 2.
Figure 16:
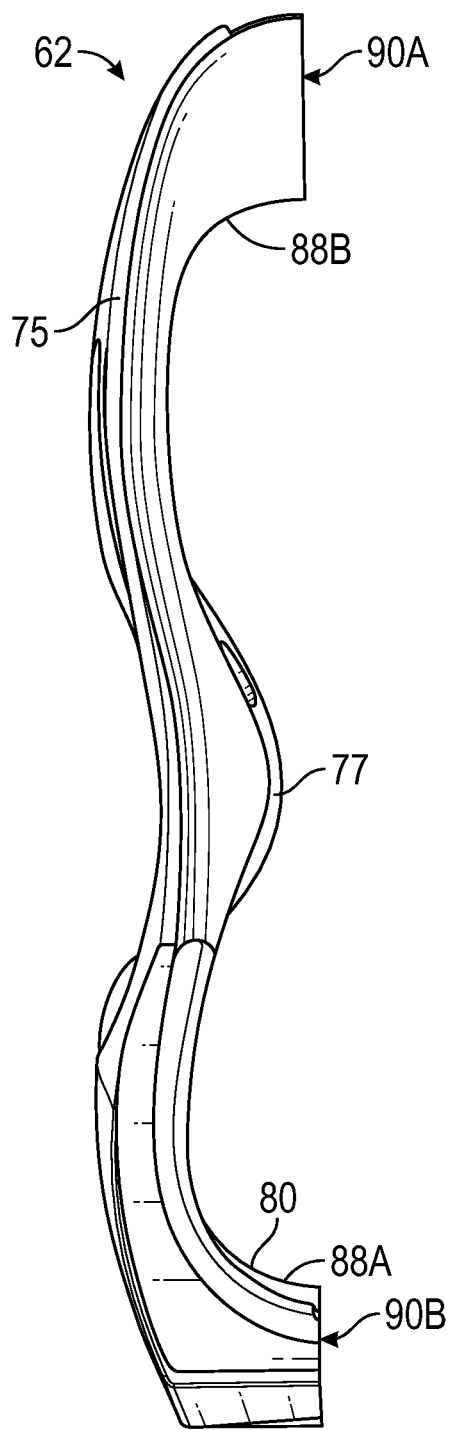
FIG. 16 is a top view of a medial shell body of the outer shell of FIG. 14.
Figure 17:
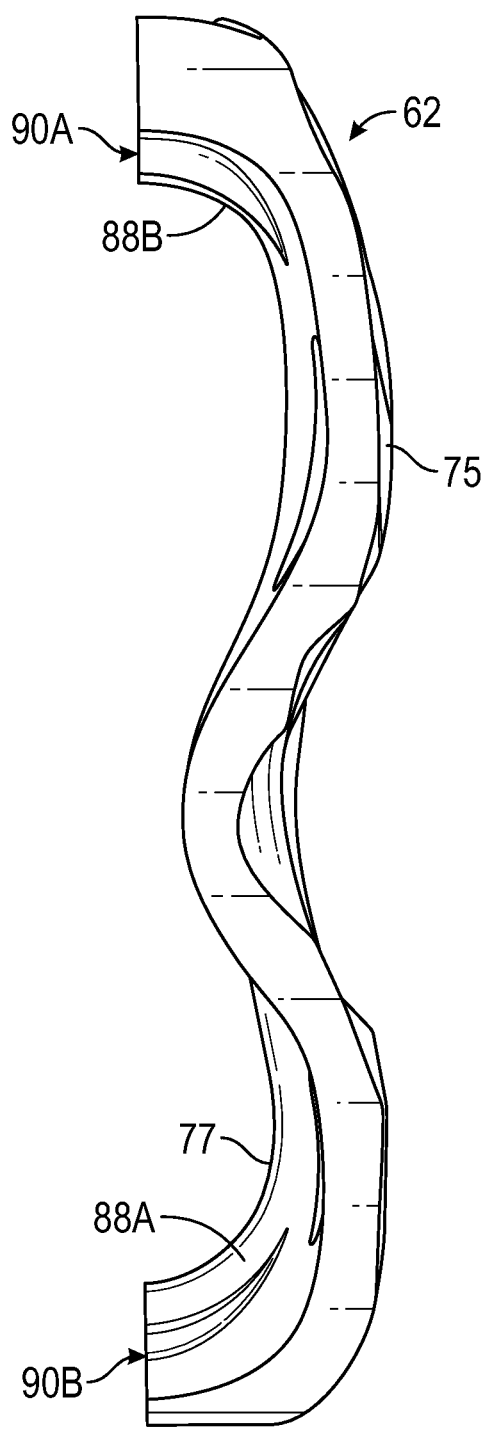
FIG. 17 is a bottom view of the medial shell body of FIG. 16.
Figure 18:
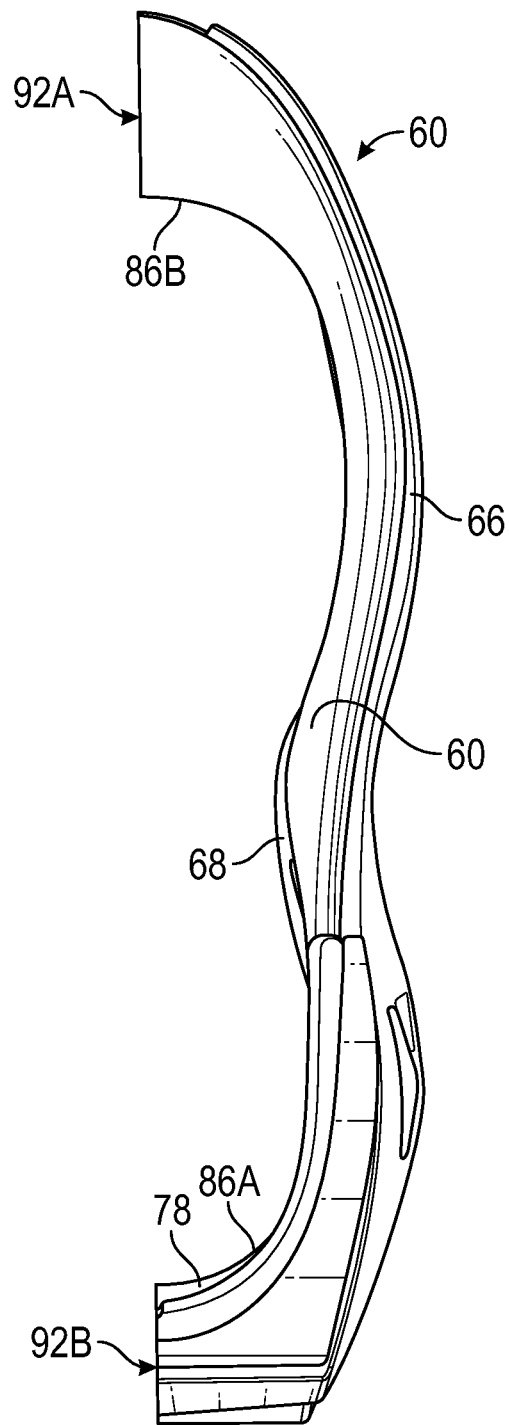
FIG. 18 is a top view of a lateral shell body of the outer shell of FIG. 14.
Figure 19:
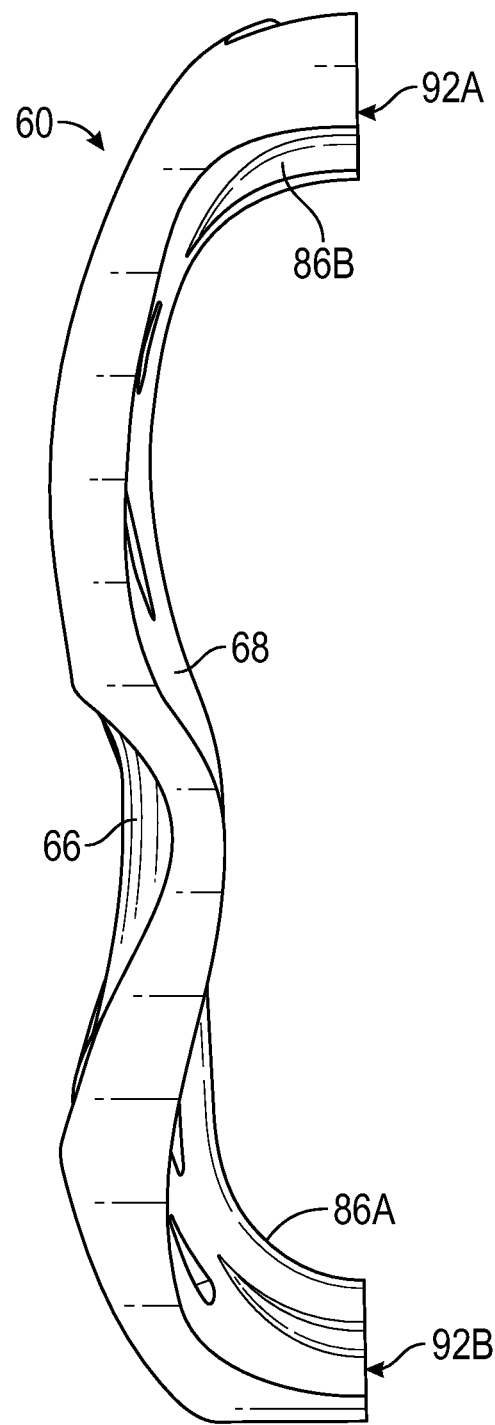
FIG. 19 is a bottom view of the lateral shell body of FIG. 18.
Figure 20:
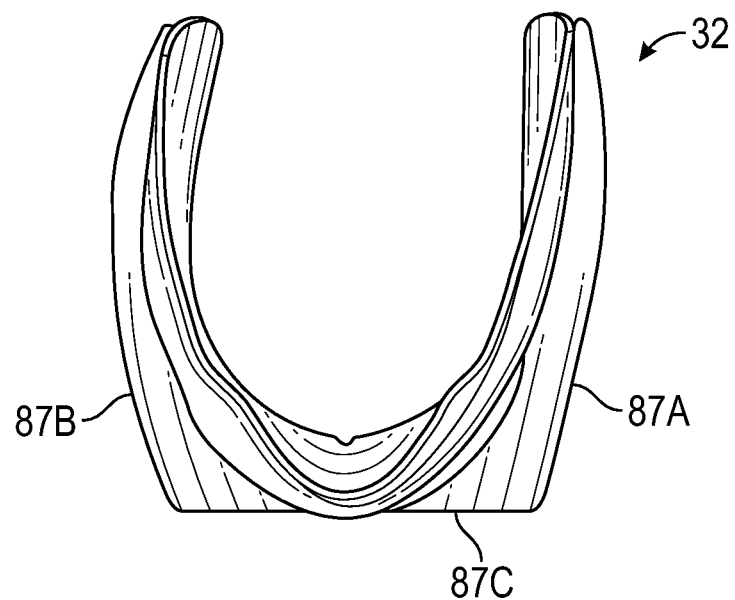
FIG. 20 is a top view of the heel counter of FIG. 2.

The lateral shell body 60 may be coupled to the medial shell body 62 forward of the midsole core 34 as shown in FIG. 2 and rearward of the midsole core 34 as best shown in FIG. 6. More specifically, the lateral shell body 60 and the medial shell body 62 may be coupled to one another at bonding surfaces when they are coupled to the side walls 71, 76 of the midsole core 34. For example, as shown in FIG. 16, the medial shell body 62 has a front bonding surface 90A that is disposed forward of the central cavity 44 and thus forward of the midsole core 34 when the medial shell body 62 is assembled to the midsole core 34. The medial shell body 62 has a rear bonding surface 90B that is disposed rearward of the central cavity 44 and thus rearward of the midsole core 34 when the medial shell body 62 is assembled to the midsole core 34. As shown in FIG. 18, the lateral shell body 60 has a front bonding surface 92A that is disposed forward of the central cavity 44 and thus forward of the midsole core 34 when the lateral shell body 60 is assembled to the midsole core 34. The lateral shell body 60 has a rear bonding surface 92B that is disposed rearward of the central cavity 44 and thus rearward of the midsole core 34 when the lateral shell body 60 is assembled to the midsole core 34. The bonding surfaces 90A, 90B and/or 92A, 92B may extend in the longitudinal direction of the article of footwear 10 (e.g., along or parallel with the longitudinal midline LM).

The bonding surface 90A is continuous with and coupled to the bonding surface 92A forward of the midsole core 34, and the bonding surface 92A is contiguous with and coupled to the bonding surface 92B rearward of the midsole core 34 in the assembled article of footwear 10. The bonding surfaces 90A, 90B and 92A, 92B may be planar as shown, and may be bonded to one another, such as by applying adhesive (e.g., primer and cement) on the bonding surfaces and then placing the bonding surfaces into contact with one another. For example, primer and cement may first be applied to the side walls 71, 76 of the midsole core 34, and to the outer ledges 46A, 46B. Primer and cement may be applied to the inner sides 68, 77 of the lateral and medial shell bodies 60, 62 and to the bonding surfaces 90A, 90B, 92A, 92B. The midsole core 34 may then be aligned with the lateral shell body 60 by fitting the inner rim 86A to the rear outer ledge 46B and the inner rim 86B to the front outer ledge 46A. The abutting surfaces will be contiguous with and bond to one another. The medial shell body 62 may then be aligned with and fit to the medial side wall 76 of the midsole core 34 by fitting the inner rim 88A to the rear outer ledge 46B and the inner rim 88B to the front outer ledge 46A. The bonding surface 92A will abut and bond to the bonding surface 90A, and the bonding surface 92B will abut and bond with the bonding surface 90B.

Figure 21:
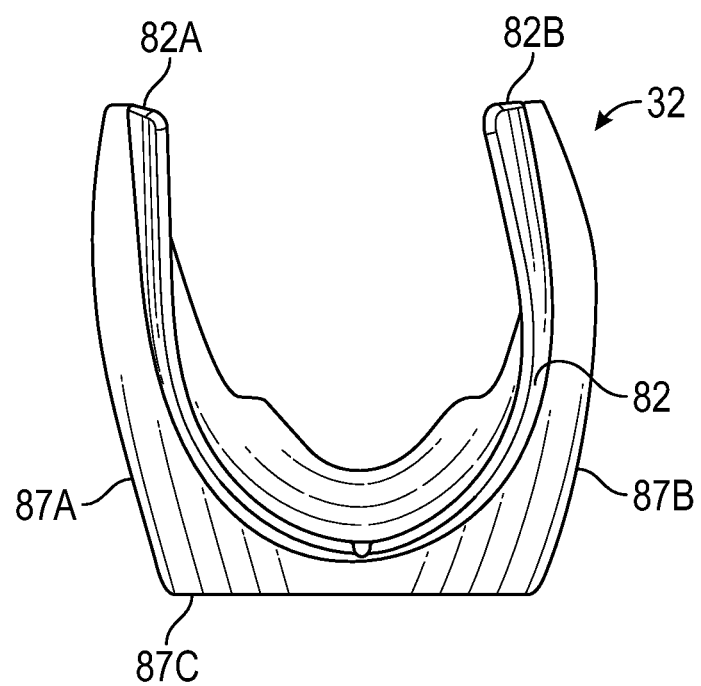
FIG. 21 is a bottom view of the heel counter of FIG. 2.

The heel counter 32 may be an injection molded polymer. FIGS. 4 and 5 show the heel counter 32 secured to the upper surface 61 of the lateral shell body 60 and the upper surface 63 of the medial shell body 62 so that the heel counter 32 is disposed in the heel region 22 of the article of footwear 10 as shown in FIG. 1. For example, the heel counter 32 may be bonded to the upper surfaces 61, 63 with primer and cement. FIGS. 9 and 14, 16, and 18 show that the upper surfaces 61, 63 are configured with slight recesses 78, 80 that serve as locating features to accurately position the heel counter 32 on the surface 61, 63. Lower portions of the recess 78 in the upper surface 61 and the recess 80 of the upper surface 63 together receive a lower flange 82 of the heel counter 32 (best shown in FIG. 21) so that the forward ends 82A, 82B of the lower flange 82 are at forward ends 78A, 80A (see FIG. 14) of the recesses 78, 80, respectively. The recesses 78, 80 have surrounding side walls 81, 83 respectively that outwardly surround the lower flange 82. The recess 78 has a side wall 85A, the recess 80 has a side wall 85B, and each recess has a portion of a rear wall 85C that together surround an outer peripheral edge of the heel counter 32 to help properly locate the heel counter 32 on the upper surfaces 61, 63. More specifically, a lateral outer peripheral edge 87A abuts the side wall 85A of the heel counter 32, a medial outer peripheral edge 87B abuts the side wall 85B of the heel counter 32, and a rear edge 87C abuts the rear walls 85C of the heel counter 32.

Figure 7:
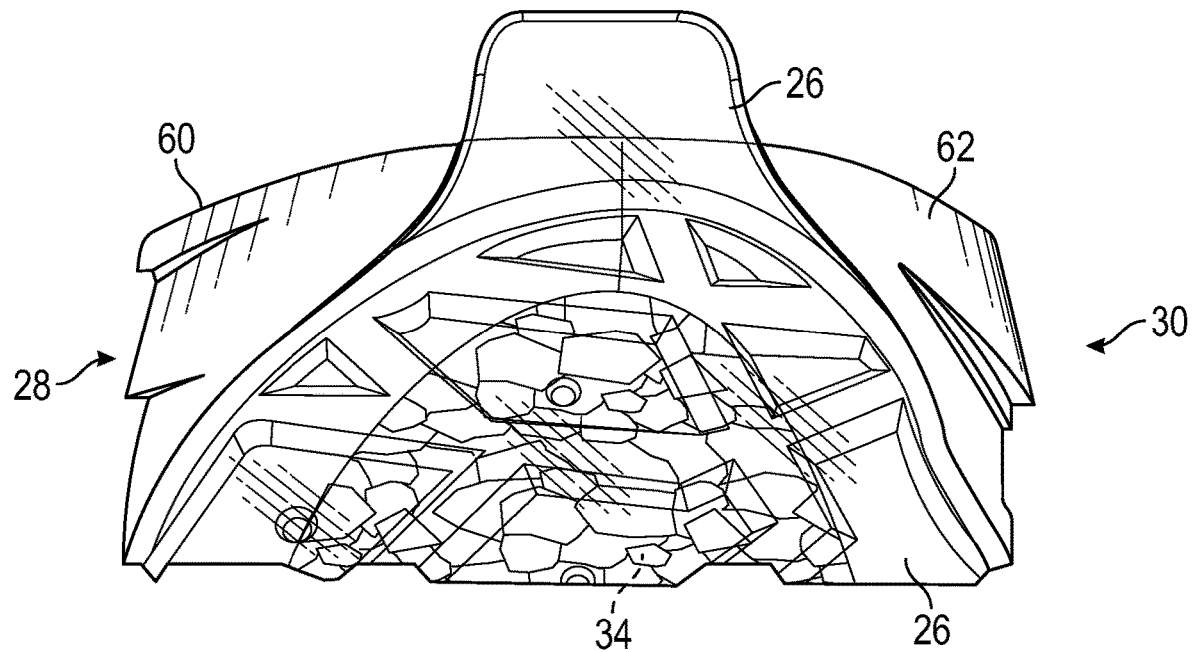
FIG. 7 is a front view of the sole structure of FIG. 2.
Figure 12:
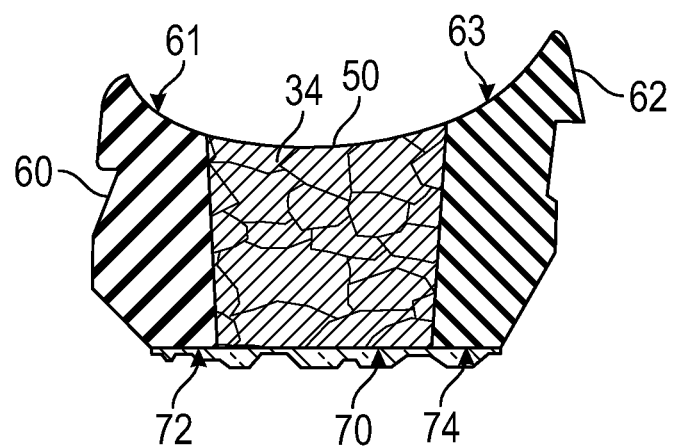
FIG. 12 is a cross-sectional view of the sole structure and heel counter of FIG. 2. taken at lines 12-12 in FIG. 2.
Figure 13:
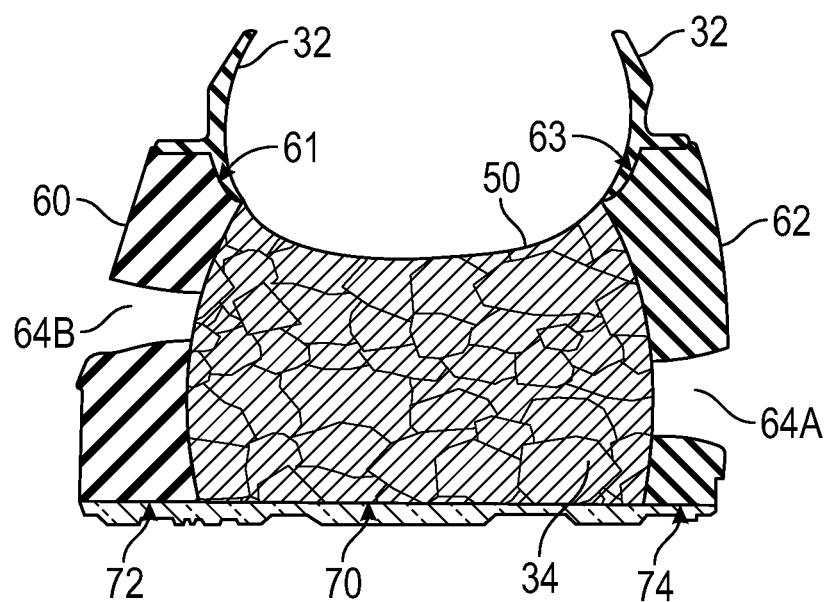
FIG. 13 is a cross-sectional view of the sole structure and heel counter of FIG. 2. taken at lines 13-13 in FIG. 2.

FIG. 6 and FIGS. 10-13, for example, show the outsole 26 extending across and secured to the lower surface 70 of the midsole core 34, the lower surface 72 of the lateral shell body 60, and the lower surface 74 of the medial shell body 62. For example, the outsole 26 may be bonded to (e.g., adhered to) the lower surfaces 70, 72, 74 with primer and cement. The outsole 26 may be at least partially transparent, so that the lateral shell body 60, the midsole core 34, and the medial shell body 62 may be viewed through the outsole 26. Any suitable standardized test may be used to determine transparency, such as American Society for Testing and Materials (ASTM) Standard D1003-00, Standard Test Method for Haze and Luminous Transmittance of Transparent Plastics. The outsole 26 also extends over a front surface of the lateral shell body 60 and the medial shell body 62 as shown in FIG. 7. FIG. 8 shows the outsole 26 including several integrally-formed lugs 26A, 26B, only some of which are labelled. The midsole core 34 including its discrete, chopped foam body pieces 36 is shown as visible through the transparent outsole in FIG. 8.

Figure 25A:
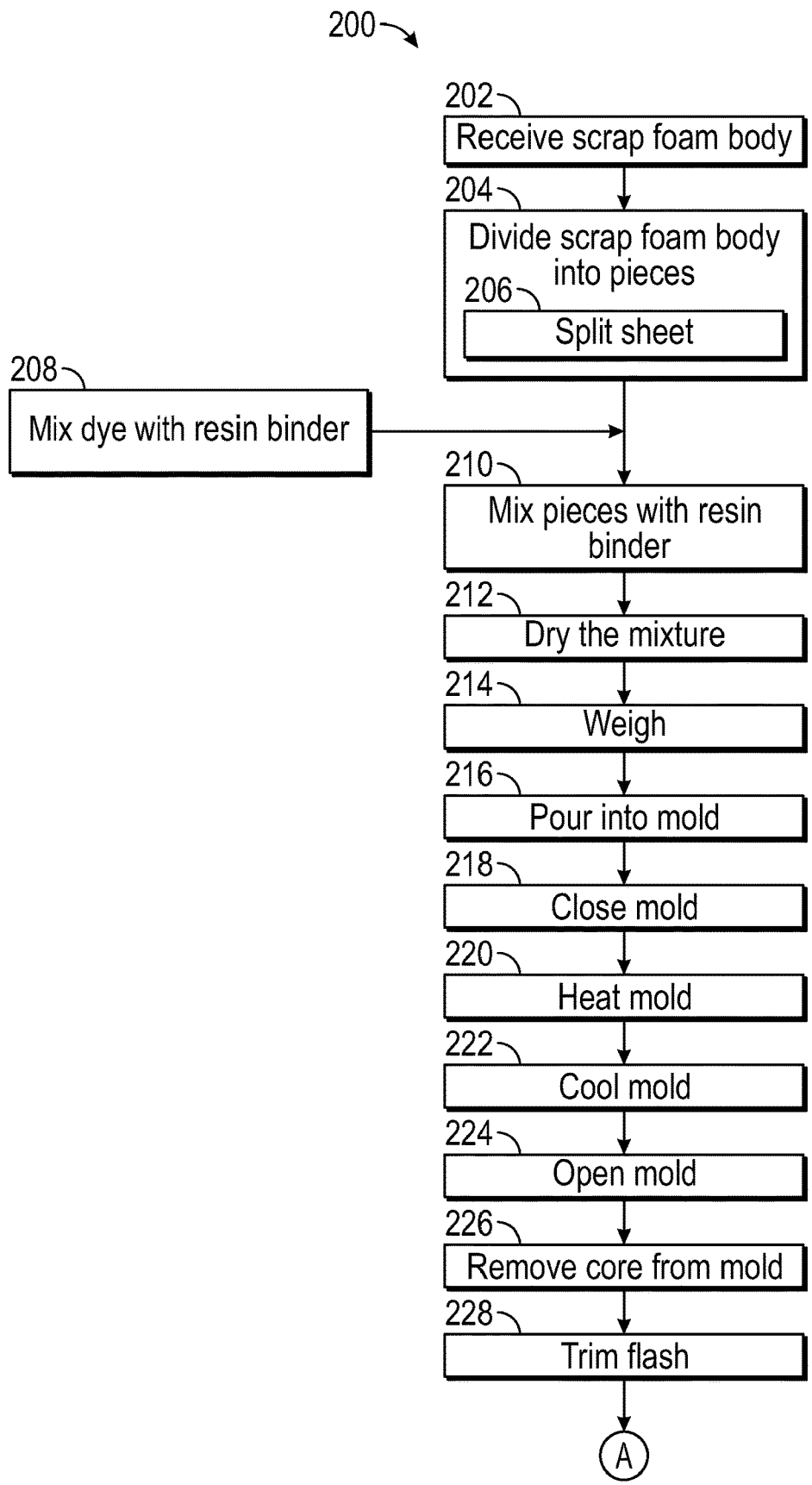
FIG. 25A is a first portion of a flowchart of an example method of manufacturing the article of footwear of FIG. 1.
Figure 25B:
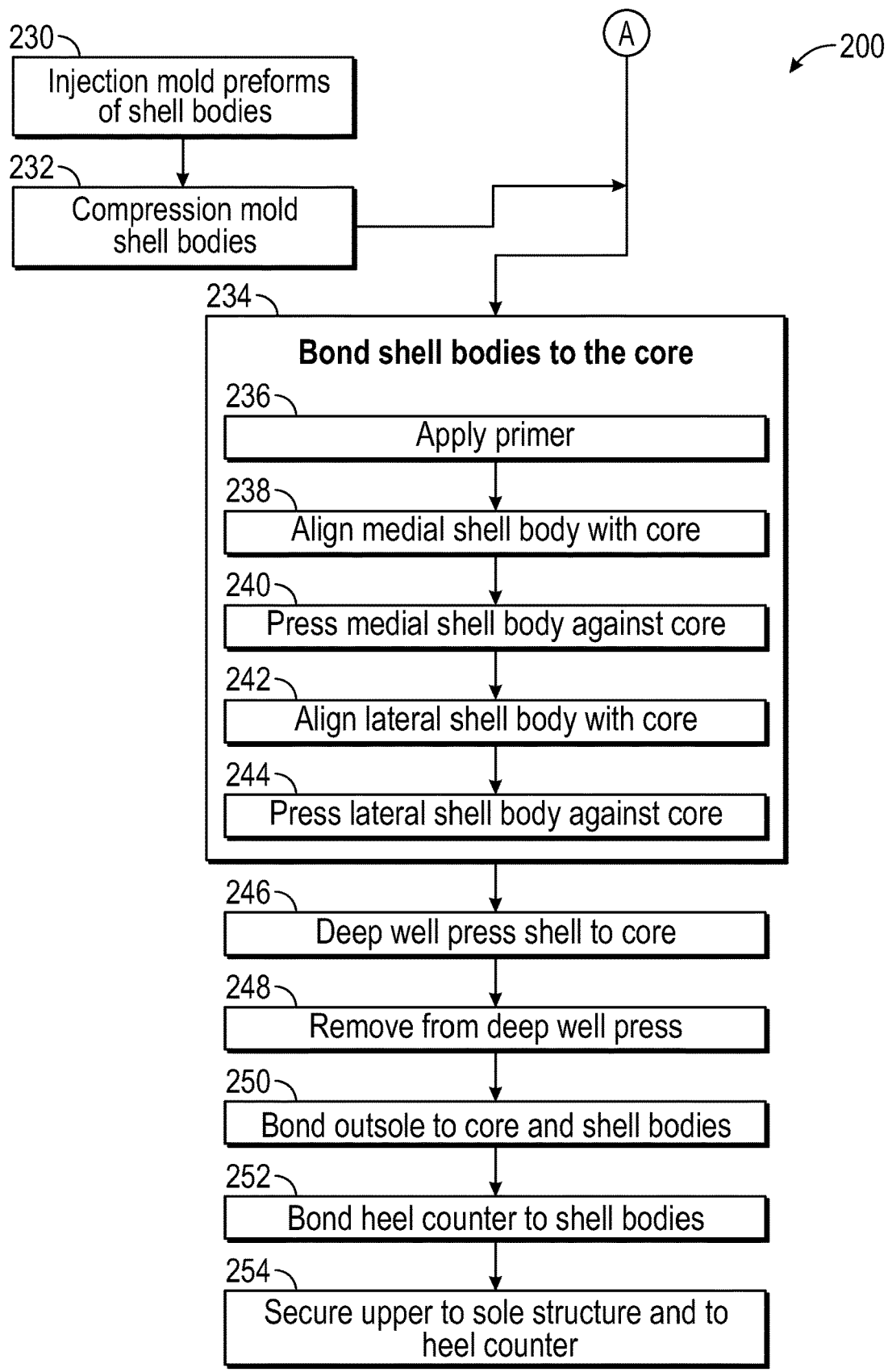
FIG. 25B is a second portion of the flowchart of the example method of manufacturing the article of footwear of FIG. 1.

FIGS. 25A and 25B are a flowchart of one example of a method 200 of manufacturing an article of footwear such as the article of footwear 10. The steps are shown in chronological order, although another order may be possible. The circled A shows where the steps shown in FIG. 25B continue from those shown in FIG. 25A.

The method 200 may comprise step 202, receiving a scrap foam body such as the scrap foam body 38 of FIG. 22. For example, the scrap foam may be Pebax® foam in the form of a sheet from which a plurality of midsole layers used for other articles of footwear of a different configuration than article of footwear 10 have already been cut or otherwise removed. The method 200 is not limited to the use of Pebax® foam. Most scrap foam bodies may be recycled under the method 200 as the initial shape of the scrap foam body is largely irrelevant after it is subjected to potential splitting and to the cutting process (e.g., chopping process) described herein. The scrap foam body 38 is thus not wasted but is reused as a cushioning component of a footwear sole structure, such as a midsole component The method 200 then proceeds with step 204, cutting the scrap foam body 38 into pieces 36. Cutting the scrap foam body 38 into pieces 36 may be by chopping the scrapped foam body 38 such that the pieces 36 are chopped pieces. If the scrap foam body 38 is in sheet form, step 204 may first include a sub-step of splitting the scrap foam body 38 to a thickness in the Z direction of about 10 mm (e.g., from about 8 mm to about 12 mm). Step 204 may include sub-steps of multiple passes through one or more chopping machines. For example, the scrap foam body 38 (or bodies if split) may be placed through a chopping machine for a first pass with vertical cuts, and then placed again through a chopping machine for a second pass with vertical cuts, then a third time through a chopping machine that provides random cuts with blades at various angles. The cutting process of step 204 is selected to result in pieces 36 configured with a plurality of different polyhedron shapes and of sizes within a target range of lengths, widths, and heights between 5 mm and 40 mm to account for more than 99 percent of the original scrap foam body 38 as usable chopped pieces 36. Some of the pieces 36 resulting from this process are about 10 mm cubes. Pieces of this size result in fewer and smaller voids on the surface of the completed midsole core 34 than do larger pieces, resulting in a more even surface and denser edges of the completed midsole core 34 (for comfort at the foot-facing surface, for structural stability at the edges, and for adequate bonding surfaces for the outer shell 60, 62). In some examples, the scrap foam body 38 may be divided into pieces in some other manner than by cutting in step 204, such as by crumbling or tearing the scrap foam body 38. However, cutting the scrap foam body 38 into cut pieces 36 by the use of a cutting machine can achieve the target sizes with greater accuracy than if other methods of dividing the scrap foam body 38 (e.g., crumbling or tearing) were used. Additionally, the polyhedron-shaped pieces 36 retain their shapes after step 204. For example, they are not melted into pellets, ground, re-foamed, etc.

The method 200 may include step 208, mixing dye with a resin binder 40 to provide a desired color of the resin binder 40. Alternatively, resin binder 40 without colored dye may be used, in which case the method proceeds from step 204 (with possible sub-step 206) to step 210.

Figure 23:
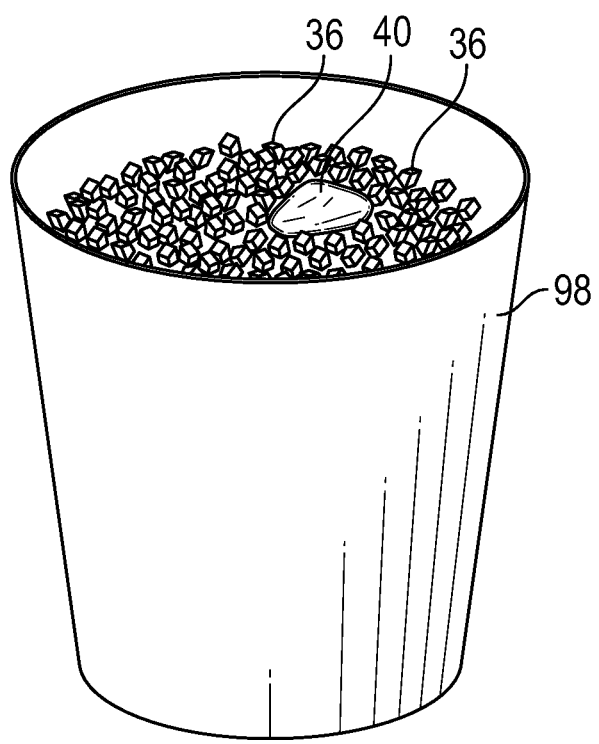
FIG. 23 is a perspective view of a container of chopped pieces of the scrap foam body of FIG. 22 and dyed resin binder.

In step 210, the cut pieces 36 are mixed with the resin binder 40 (dyed or undyed) to form a mixture. A ratio of the chopped pieces 36 to the resin binder 40 (or resin binder 40 and dye mixture) may be 1:1.5 (e.g., 1 part cut pieces 36 to 1.5 parts resin binder 40 (or resin binder 40 and dye mixture)) may be placed in a mixing container which is then placed inside of a mixing machine and mixed sufficiently to coat all outer surfaces of the cut pieces 36 with the resin binder 40. For example, a mixing time of 5 to 6 minutes for a 20-liter volume in a commercial mixer may be implemented. FIG. 23 shows pieces 36 and dyed resin 40 in a mixture held in a mixing container 98 prior to being completely mixed.

Figure 24:
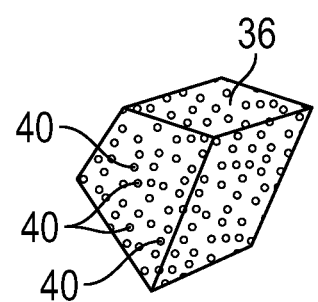
FIG. 24 is a perspective view of a single chopped piece of the scrap foam body coated with the resin binder.

After mixing in step 210, the method 200 may proceed to step 212, drying the mixture. For example, the resin-coated cut pieces 36 may be dried until only solid resin 40 remains coating the outer surfaces of the cut pieces 36. The resin binder-coated cut pieces 36 may be removed from the mixer and placed in a dryer for 30 minutes at 80 degrees Celsius, for example. FIG. 24 shows one example cut piece 36 having a polyhedron shape, coated with resin 40, and after drying.

Once dried, the method 200 moves to step 214, weighing an amount of the resin-coated pieces to provide a predetermined weight and then, step 216, pouring the weighed mixture of pieces 36 coated with resin 40 (now in a dried state) into a compression mold that together will compress the mixture to provide a midsole core 34 with the shape and dimensions of FIG. 2. For example, the weighed amount may be poured into a bottom portion of the mold. Next, in step 218, the mold may be closed by closing a top portion to provide a compression ratio of the resin-coated pieces 36 of about 150 to 160%.

In step 220, the mold may be heated to about 163 degrees Celsius and then in step 222 cooled to below 30 degrees Celsius. In step 224, the mold is opened, in step 226, the midsole core 34 is removed from the mold, and in step 228, the midsole core 34 is trimmed to remove any flash. Notably, the pieces 36 retain their shapes through the subsequent steps after the cutting step 204 (e.g., through the drying, heating, and cooling steps, etc.) so that the completed midsole core as disposed in the finished article of footwear 10 is comprised of foam pieces 36 that are randomly disposed, have different polyhedron shapes, and may be within a target range of dimensions as determined by the spacing of cutting blades in the cutting step 204.

The lateral shell body 60 and the medial shell body 62 used in the sole structure 12 may be obtained already in a formed state (e.g., may be formed by a different entity) or may be formed by the entity carrying out the method 200. Accordingly, if formed by the entity carrying out the method 200, then the method 200 may include injection molding a preform of each of the medial shell body 62 and the lateral shell body 60 in a respective heated mold for a predetermined amount of time in step 230, and then compression molding the preforms to provide the medial shell body 62 and the lateral shell body 60 in step 232. Step 232 may include sub-steps of heating and cooling while in the mold, then trimming, washing, and drying after removal from the mold. In an example, the medial shell body 62 and the lateral shell body 60 comprise Phylon.

The method may include step 234, bonding the medial shell body 62 and the lateral shell body 60 to the midsole core 34 by stock-fitting (e.g., manually assembling) the components. Step 234 may include sub-step 236, applying adhesive to the medial shell body 62, applying adhesive to the medial side of the midsole core 34, such as from the forward extent 54, along the medial side wall 76, to the rear extent 56. Similarly, sub-step 236 may include applying adhesive to the lateral shell body 60, and applying adhesive to the lateral side of the midsole core 34, such as from the forward extent 54, along the lateral side wall 71, to the rear extent 56. Applying adhesive in sub-step 236 may include applying primer and applying cement, for example.

Next, step 234 may include sub-step 238, aligning the medial shell body 62 with the midsole core 34 by mating an alignment feature of the medial shell body 62 (e.g., the inner rims 88A, 88B) with a complementary alignment feature of the midsole core 34 (e.g., the rear notch 48B mates with the rear inner rim 88A and the front notch 48A mates with the front inner rim 88B so that the rim 88A rests on the rear outer ledge 46B and the rim 88B rests on the front outer ledge 46A). Once aligning is complete, the method 200 moves to step 240, pressing the medial shell body 62 against the medial side of the midsole core 34. In step 242, the lateral shell body 60 is aligned with the midsole core 34 by mating an alignment feature of the lateral shell body 60 (e.g., the inner rims 86A, 86B) with a complementary alignment feature of the midsole core 34 (e.g., the rear notch 48B mates with the rear inner rim 86A and the front notch 48A mates with the front inner rim 86B so that the rim 86A rests on the rear outer ledge 46B and the rim 86B rests on the front outer ledge 46A). In step 244, the lateral shell body 60 is pressed against the lateral side of the midsole core 34.

Accordingly, in step 234, the inner side 77 of the medial shell body 62 bonds to the medial side wall 76 of the midsole core 34 and to the ledges 46A, 46B, the inner side 68 of the lateral shell body 60 bonds to the lateral side wall 71 of the midsole core 34 and to the ledges 46A, 46B, and the laterally-extending bonding surfaces 92A, 92B bond to the bonding surfaces 90A, 90B.

The step 234 may be referred to as stock-fitting the shell bodies 60, 62 to the midsole core 34 as the assembly and pressing is done manually. After stock-fitting the components to one another, the method 200 may move to step 246, in which the outer shell 60, 62 and the midsole core 34 to which the outer shell 60, 62 is bonded are further compressed by machine, such as in a deep well press, to ensure secure bonding.

After step 246, and after the outer shell 60, 62 and midsole core 34 are removed from the machine press in step 248, the method 200 may further comprise step 250, bonding an outsole 26 to a lower surface 70 of the midsole core 34, to a lower surface 72 of the lateral shell body 60, and to a lower surface 74 of the medial shell body 62.

Still further, the method 200 may include step 252, bonding the heel counter 32 to the upper surface 61 of the lateral shell body 60 and to the upper surface 63 of the medial shell body 62 in the heel region 22.

Additional steps of the method 200 may include assembling various components of the upper 14 by stitching, adhesive, and heat bonding, etc. Alternatively, the upper 14 may be assembled by a different entity so that it is ready for lasting and/or securement to a strobel. In step 254, the upper 14 may be secured to the sole structure 12 and to the heel counter 32. This may include various sub-steps such as securing a strobel to the upper 14 on a last, and applying adhesive (e.g., primer and cement) to the strobel and to the heel counter 32, and pressing the upper surface 50 of the midsole core 34 and the upper surfaces 61, 63 of the outer shell 60, 62 against the strobel and the heel counter 32 against the rear of the upper 14 in the heel region 22.

Accordingly, the method of manufacturing 200 an article of footwear 10 disclosed herein results in a unique insole with a midsole core and an outer shell. The method of manufacturing 200 may increase the environmental sustainability of footwear manufacturing by utilize scrap foam as discussed herein.

The following Clauses provide example configurations of an article of footwear disclosed herein.

Clause 1. A method of manufacturing an article of footwear, the method of manufacturing comprising: receiving a scrap foam body; cutting the scrap foam body into pieces; mixing the pieces with a resin binder to form a mixture; and compression molding the mixture in a mold to form a cushioning component of a sole structure of the article of footwear.

Clause 2. The method of manufacturing of clause 1, further comprising: prior to compression molding the mixture in the mold: drying the mixture; and pouring the mixture into a mold.

Clause 3. The method of manufacturing of any of clauses 1-2, further comprising: prior to mixing the pieces with the resin binder, adding dye to the mixture.

Clause 4. The method of manufacturing of any of clauses 1-3, wherein the cushioning component is a midsole core, and the method further comprising: bonding a medial shell body to a medial side of the midsole core and a lateral shell body to a lateral side of the midsole core so that the medial shell body and the lateral shell body form an outer shell defining a central cavity with the midsole core disposed in the central cavity.

Clause 5. The method of manufacturing of clause 4, wherein bonding the medial shell body to the medial side of the midsole core includes applying adhesive to the medial shell body and applying adhesive to the medial side of the midsole core and pressing the medial shell body against the medial side of the midsole core; wherein bonding the lateral shell body to the lateral side of the midsole core includes applying adhesive to the lateral shell body and applying adhesive to the lateral side of the midsole core and pressing the lateral shell body against the lateral side of the midsole core.

Clause 6. The method of manufacturing of any of clauses 4-5, further comprising: prior to pressing the medial shell body against the medial side of the midsole core and pressing the lateral shell body against the lateral side of the midsole core, aligning the medial shell body and the lateral shell body with the midsole core by mating an alignment feature of the medial shell body and an alignment feature of the lateral shell body with a complementary alignment feature of the midsole core.

Clause 7. The method of manufacturing of any of clauses 4-6, further comprising: bonding an outsole to a lower surface of the midsole core, to a lower surface of the lateral shell body, and to a lower surface of the medial shell body.

Clause 8. The method of manufacturing of any of clauses 4-7, further comprising: bonding a heel counter to an upper surface of the lateral shell body and to an upper surface of the medial shell body in a heel region of the article of footwear.

Clause 9. An article of footwear comprising: a sole structure including a unitary cushioning component comprising a plurality of scrap foam pieces configured as a plurality of different polyhedron shapes and a resin binder securing the scrap foam pieces to one another.

Clause 10. The article of footwear of clause 9, wherein the cushioning component is a midsole core, the sole structure further includes an additional cushioning component configured as an outer shell defining a central cavity, and the midsole core is disposed in the central cavity.

Clause 11. The article of footwear of clause 10, wherein the outer shell comprises: a lateral shell body extending along a lateral side of the midsole core; a medial shell body extending along a medial side of the midsole core; and wherein the lateral shell body is coupled to the medial shell body forward of the midsole core and rearward of the midsole core.

Clause 12. The article of footwear of clause 11, wherein the central cavity is a through hole and an upper surface and a lower surface of the midsole core are exposed in the central cavity.

Clause 13. The article of footwear of clause 12, wherein the upper surface of the midsole core is flush with the lateral shell body and the medial shell body, the lower surface of the midsole core is flush with the lateral shell body and the medial shell body, or both the upper surface and the lower surface of the midsole core are flush with the lateral shell body and the medial shell body.

Clause 14. The article of footwear of any of clauses 11-13, wherein: at least one of the medial shell body or the lateral shell body has an inner side and an outer side and defines at least one through hole extending from the inner side to the outer side; and the midsole core extends across the at least one through hole at the inner side.

Clause 15. The article of footwear of any of clauses 11-13, wherein: the lateral shell body and the medial shell body each have an inner rim extending inward into the central cavity; and the midsole core interfits with the lateral shell body and the medial shell body at the inner rim so that the inner rim rests on the midsole core.

Clause 16. The article of footwear of any of clauses 11-15, wherein: the lateral shell body has a bonding surface forward of the midsole core; and the medial shell body has a bonding surface forward of the midsole core contiguous with and coupled to the bonding surface of the lateral shell body.

Clause 17. The article of footwear of any of clauses 11-16, wherein: the lateral shell body has a bonding surface rearward of the midsole core; and the medial shell body has a bonding surface rearward of the midsole core contiguous with and coupled to the bonding surface of the lateral shell body.

Clause 18. The article of footwear of clause 17, wherein the bonding surface of the lateral shell body and the bonding surface of the medial shell body extend in a longitudinal direction of the article of footwear.

Clause 19. The article of footwear of any of clauses 11-18, further comprising: an outsole extending across and secured to the lower surface of the midsole core, a lower surface of the lateral shell body, and a lower surface of the medial shell body.

Clause 20. The article of footwear of any of clauses 11-19, further comprising: a heel counter secured to an upper surface of the lateral shell body and an upper surface of the medial shell body in a heel region of the article of footwear.

Clause 21. The article of footwear of any of clauses 10-20, wherein the midsole core is a first foam material and the outer shell is a second foam material different than the first foam material.

Clause 22. The article of footwear of any of clauses 9-21, the cushioning component further comprising a dye mixed in the resin binder.

Clause 23. The article of footwear of any of clauses 9-22, wherein the scrap foam pieces comprise Pebax® foam and the resin binder comprises polyurethane.

Clause 24. An article of footwear comprising: a midsole including: a first cushioning component configured as a midsole core; and a second cushioning component configured as an outer shell defining a central cavity; wherein the midsole core is disposed in the central cavity with the outer shell bordering a lateral side and a medial side of the midsole core and defining a plurality of through holes exposing the lateral side and the medial side of the midsole core.

Clause 25. The article of footwear of clause 24, wherein the central cavity is a through hole and an upper surface and a lower surface of the midsole core are exposed in the central cavity.

Clause 26. The article of footwear of any of clauses 24-25, wherein the outer shell comprises: a lateral shell body extending along the lateral side of the midsole core; a medial shell body extending along the medial side of the midsole core; and wherein the lateral shell body is coupled to the medial shell body forward of the midsole core and rearward of the midsole core.

Clause 27. The article of footwear of clause 26, wherein an upper surface of the midsole core is flush with the lateral shell body and the medial shell body, a lower surface of the midsole core is flush with the lateral shell body and the medial shell body, or both the upper surface and the lower surface of the midsole core are flush with the lateral shell body and the medial shell body.

Clause 28. The article of footwear of any of clauses 26-27, wherein at least one of the medial shell body or the lateral shell body has an inner side and an outer side and at least one of the plurality of through holes extends from the inner side to the outer side and the midsole core extends across the through hole at the inner side.

Clause 29. The article of footwear of any of clauses 26-28, wherein: the lateral shell body and the medial shell body each have an inner rim extending inward into the central cavity; and the midsole core interfits with the lateral shell body and the medial shell body at the inner rim so that the inner rim rests on the midsole core.

Clause 30. The article of footwear of any of clauses 26-29, wherein: the lateral shell body has a bonding surface forward of the midsole core; and the medial shell body has a bonding surface forward of the midsole core contiguous with and coupled to the bonding surface of the lateral shell body.

Clause 31. The article of footwear of any of clauses 26-30, wherein: the lateral shell body has a bonding surface rearward of the midsole core; and the medial shell body has a bonding surface rearward of the midsole core contiguous with and coupled to the bonding surface of the lateral shell body.

Clause 32. The article of footwear of any of clauses 26-31, wherein the bonding surface of the lateral shell body and the bonding surface of the medial shell body extend in a longitudinal direction of the article of footwear.

Clause 33. The article of footwear of any of clauses 26-32, further comprising: an outsole extending across and secured to the lower surface of the midsole core, a lower surface of the lateral shell body, and a lower surface of the medial shell body.

Clause 34. The article of footwear of any of clauses 26-33, further comprising: a heel counter secured to an upper surface of the lateral shell body and an upper surface of the medial shell body in a heel region of the article of footwear.

Clause 35. The article of footwear of any of clauses 26-34, wherein the midsole core includes recycled foam pieces and resin binder coating the recycled foam pieces.

Clause 36. The article of footwear of clause 35, wherein the midsole core further includes a dye mixed in the resin binder.

Clause 37. The article of footwear of any of clauses 35-36, wherein the recycled foam pieces comprise Pebax® foam and the resin binder comprises polyurethane.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of a shoe extends between a forefoot region and a heel region of the shoe. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending along a width of a component. For example, a transverse direction of a shoe extends between a lateral side and a medial side of the shoe. The transverse direction or axis may also be referred to as a lateral direction or axis or a mediolateral direction or axis.

The term "vertical" refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the shoe is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the shoe in an assembled shoe. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method of manufacturing an article of footwear, the method of manufacturing comprising:
   receiving a scrap foam body;
   cutting the scrap foam body into pieces;
   mixing the pieces with a resin binder to form a mixture;
   compression molding the mixture in a mold to form a midsole core of a sole structure of the article of footwear;
   aligning a medial shell body and a lateral shell body with the midsole core by mating an alignment feature of the medial shell body and an alignment feature of the lateral shell body with a complementary alignment feature of the midsole core; and
   after aligning the medial shell body and the lateral shell body to the midsole core, bonding the medial shell body to a medial side of the midsole core and the lateral shell body to a lateral side of the midsole core so that the medial shell body and the lateral shell body form an outer shell defining a central cavity with the midsole core disposed in the central cavity;
   wherein the alignment feature of the lateral shell body includes inner rims extending inward into the central cavity and the alignment feature of the medial shell body includes inner rims extending inward into the central cavity;
   wherein the complementary alignment feature of the midsole core includes a front notch defining an upward-facing front outer ledge extending only in a forefoot region of the article of footwear and a rear notch defining an upward-facing rear outer ledge extending only in a heel region of the article of footwear; and
   wherein mating the alignment feature of the medial shell body and the alignment feature of the lateral shell body with the complementary alignment features of the midsole core includes resting the inner rims of the medial shell body and the inner rims of the lateral shell body on the upward-facing front outer ledge and the upward-facing rear outer ledge of the midsole core.

2. The method of manufacturing of claim 1, further comprising:
   prior to compression molding the mixture in the mold:
      drying the mixture; and
      pouring the mixture into a mold.

3. The method of manufacturing of claim 1, further comprising:
   prior to mixing the pieces with the resin binder, adding dye to the mixture.

4. The method of manufacturing of claim 1, wherein bonding the medial shell body to the medial side of the midsole core includes applying adhesive to the medial shell body and applying adhesive to the medial side of the midsole core and pressing the medial shell body against the medial side of the midsole core; and
   wherein bonding the lateral shell body to the lateral side of the midsole core includes applying adhesive to the lateral shell body and applying adhesive to the lateral side of the midsole core and pressing the lateral shell body against the lateral side of the midsole core.

5. The method of manufacturing of claim 1, further comprising:
   bonding an outsole to a lower surface of the midsole core, to a lower surface of the lateral shell body, and to a lower surface of the medial shell body.

6. The method of manufacturing of claim 1, further comprising:
   bonding a heel counter to an upper surface of the lateral shell body and to an upper surface of the medial shell body in a heel region of the article of footwear.

7. The method of manufacturing of claim 1, wherein the cutting is selected to result in the pieces having a plurality of different polyhedron shapes.

8. The method of manufacturing of claim 1, wherein the lateral shell body has a planar bonding surface forward of the midsole core and extending in a longitudinal direction of the article of footwear;
   wherein the medial shell body has a planar bonding surface forward of the midsole core and extending in the longitudinal direction of the article of footwear; and
   wherein bonding the medial shell body to the medial side of the midsole core and to the lateral shell body is such that the planar bonding surface of the lateral shell body is contiguous with and coupled to the planar bonding surface of the lateral shell body.

9. The method of manufacturing of claim 1, wherein the lateral shell body has a planar bonding surface rearward of the midsole core and extending in the longitudinal direction of the article of footwear;
   wherein the medial shell body has a planar bonding surface rearward of the midsole core and extending in the longitudinal direction of the article of footwear; and
   wherein bonding the lateral shell body to the lateral side of the midsole core is such that the planar bonding surface of the lateral shell body rearward of the midsole core is contiguous with and coupled to the planar bonding surface of the lateral shell body rearward of the midsole core.

* * * * *